US005963000A

United States Patent [19]

Tsutsumi et al.

[11] Patent Number: 5,963,000
[45] Date of Patent: Oct. 5, 1999

[54] OBJECT SENSOR SYSTEM FOR AUTOMATIC SWING DOOR

[75] Inventors: Koji Tsutsumi; Ye Zengguang, both of Kobe, Japan

[73] Assignee: Nabco Limited, Kobe, Japan

[21] Appl. No.: 08/790,914

[22] Filed: Jan. 29, 1997

[30] Foreign Application Priority Data

Jan. 31, 1996 [JP] Japan .................................... 8-038824

[51] Int. Cl.[6] .............................. G05B 5/00; E05F 15/12

[52] U.S. Cl. .......................... 318/480; 318/450; 318/460; 318/467; 250/221; 250/222.1; 49/25; 49/26

[58] Field of Search .................................... 318/430–480; 49/25, 26, 28, 31; 250/221, 338, 209, 222; 340/545

[56] References Cited

U.S. PATENT DOCUMENTS

| | | | |
|---|---|---|---|
| 3,852,592 | 12/1974 | Scoville et al. | 250/221 |
| 4,272,921 | 6/1981 | Jorgensen . | |
| 4,467,251 | 8/1984 | Jönsson . | |
| 4,560,912 | 12/1985 | Jönsson . | |
| 4,564,029 | 1/1986 | Kornbrekke et al. . | |
| 4,565,029 | 1/1986 | Kornbrekke et al. | 250/221 |
| 4,577,437 | 3/1986 | Gionet et al. . | |
| 4,590,410 | 5/1986 | Jönsson . | |
| 4,669,218 | 6/1987 | Kornbrekke et al. | 250/221 |
| 4,698,937 | 10/1987 | Kornbrekke et al. | 250/221 |
| 4,823,010 | 4/1989 | Kornbrekke et al. | 250/341 |
| 4,851,746 | 7/1989 | Milke | 318/467 |
| 4,888,532 | 12/1989 | Jösson . | |
| 4,910,464 | 3/1990 | Trett et al. | 250/221 |
| 4,967,083 | 10/1990 | Kornbrekke et al. | 250/341 |
| 5,276,391 | 1/1994 | Jönsson . | |

FOREIGN PATENT DOCUMENTS

| | | |
|---|---|---|
| 0144882 | 6/1985 | European Pat. Off. . |
| 33 44 576 C1 | 6/1985 | Germany . |
| 44 15 401 C1 | 7/1995 | Germany . |

*Primary Examiner*—Paul Ip
*Attorney, Agent, or Firm*—William H. Murray

[57] ABSTRACT

A object sensor system for a swing door includes swing-side and approach-side sensors. Each of the sensors includes light-emitters and light-receivers which are mounted on a swing door. The light-emitters emit light toward a floor, and the light-receivers receive the light as reflected from the floor. The light emitted and received provides an object sensing zone which has a rectangular shape on the floor having a width equal to or larger than the width of the door. The sensing zone includes a main sensing area closer to the door and an auxiliary sensing area extending along the main sensing area. The auxiliary sensing area is disabled when the door moves.

33 Claims, 31 Drawing Sheets

| DIP Switches \ Function | | Approach(A) or Swing(S) | | Single(S) or Double(D) | | Sensing Area Size | | | | Temporary(T)-Stop or Complete(C)-Stop and Sense | |
|---|---|---|---|---|---|---|---|---|---|---|---|
| | | A | S | S | D | A | B | C | D | T | C |
| SW1 | 1 | ON | OFF | | | | | | | | |
| | 2 | | | ON | OFF | | | | | | |
| | 3 | | | | | | | | | | |
| | 4 | | | | | | | | | | |
| | 5 | | | | | ON | ON | OFF | OFF | | |
| | 6 | | | | | ON | OFF | ON | OFF | | |
| SW2 | 7 | | | | | | | | | ON | OFF |
| | 8 | | | | | | | | | | |
| | 9 | | | | | | | | | | |
| | 10 | | | | | | | | | | |
| | 11 | | | | | | | | | | |
| | 12 | | | | | | | | | | |

FIG.15A

| DIP Switches \ Function | | Stationary Object Sensing Time | | | | Area Disable(D) or Enable(E) | | Light Emitting Period | | | |
|---|---|---|---|---|---|---|---|---|---|---|---|
| | | 15 | 30 | 90 | 300 | D | E | A | B | C | D |
| SW1 | 1 | | | | | | | | | | |
| | 2 | | | | | | | | | | |
| | 3 | | | | | | | | | | |
| | 4 | | | | | | | | | | |
| | 5 | | | | | | | | | | |
| | 6 | | | | | | | | | | |
| SW2 | 7 | | | | | | | | | | |
| | 8 | ON | ON | OFF | OFF | | | | | | |
| | 9 | ON | OFF | ON | OFF | | | | | | |
| | 10 | | | | | ON | OFF | | | | |
| | 11 | | | | | | | ON | ON | OFF | OFF |
| | 12 | | | | | | | ON | OFF | ON | OFF |

FIG.15B

| Light- Recever Switching Signal | | | |
|---|---|---|---|
| P 17 | P 18 | P 19 | |
| 0 | 0 | 0 | R1, R3 |
| 1 | 0 | 0 | R2, R4 |
| 0 | 1 | 0 | R5, R13 |
| 1 | 1 | 0 | R6, R8 |
| 0 | 0 | 1 | R7, R9 |
| 1 | 0 | 1 | R10, R12 |
| 0 | 1 | 1 | R11, R15 |
| 1 | 1 | 1 | R14, R16 |

FIG. 16

| Door Angle | Pulse Count | R10 | R11 | R12 | R13 |
|---|---|---|---|---|---|
| 0～2 | 0～4 | 50 | 60 | 55 | 70 |
| 89～90 | 148～151 | 100 | 90 | 88 | 95 |

FIG. 17(a)

<table>
<tr><th rowspan="2">Door Angle</th><th rowspan="2">Pulse Count</th><th colspan="2">(R1+R3)/2</th><th colspan="2">(R2+R4)/2</th><th rowspan="2">R5</th></tr>
<tr></tr>
<tr><td rowspan="2">0～2</td><td rowspan="2">0～4</td><td>R1</td><td>R3</td><td>R2</td><td>R4</td><td rowspan="2">70</td></tr>
<tr><td>50</td><td>55</td><td>60</td><td>66</td></tr>
<tr><td>3～4</td><td>5～7</td><td colspan="2">70</td><td colspan="2">60</td><td>55</td></tr>
<tr><td>5～6</td><td>8～10</td><td colspan="2">75</td><td colspan="2">80</td><td>85</td></tr>
<tr><td>7～8</td><td>11～13</td><td colspan="2">78</td><td colspan="2">81</td><td>82</td></tr>
<tr><td>⋮</td><td>⋮</td><td colspan="2">⋮</td><td colspan="2">⋮</td><td>⋮</td></tr>
<tr><td>83～84</td><td>139～141</td><td colspan="2">90</td><td colspan="2">100</td><td>99</td></tr>
<tr><td>85～86</td><td>142～144</td><td colspan="2">96</td><td colspan="2">105</td><td>110</td></tr>
<tr><td>87～88</td><td>145～147</td><td colspan="2">98</td><td colspan="2">103</td><td>112</td></tr>
<tr><td rowspan="2">89～90</td><td rowspan="2">148～151</td><td>R1</td><td>R3</td><td>R2</td><td>R4</td><td rowspan="2">95</td></tr>
<tr><td>50</td><td>55</td><td>60</td><td>66</td></tr>
</table>

FIG. 17(b)

OBJECT SENSOR SYSTEM FOR AUTOMATIC SWING DOOR

This invention relates to an object sensor system including sensors mounted on an automatic swing door for sensing the presence of a moving object, e.g. a human, and a stationary object, e.g. a flower pot and a doormat, in or near the path along which the swing door swings.

BACKGROUND OF THE INVENTION

An automatic swing door is installed to close and open a doorway, and is rotatable about a rotation axis disposed along one side of the doorway. When a moving object, e.g. a human, enters into a sensing zone for opening the door formed on one side or "approach-side" of the door, the door is driven to swing in the direction toward the other side or "swing-side" of the door. After the moving object passes the doorway, the door is rotated toward the approach-side to thereby close the doorway. If there is an object in the path of the door either on the swing-side or the approach-side, it may collide with the swing door. In order to prevent it, a sensor is disposed on each of the approach-side and the swing-side of the swing door, so that a sensing zone for safety is formed on both sides of the door. If any object is in the sensing zone, the rotation of the door may be stopped, decelerated, or reversed to prevent the door from damaging the object.

A sensor for this purpose is disclosed in, for example, U.S. Pat. No. 4,560,912, which is an aerial radiation type. The sensor of U.S. Pat. No. 4,560,912 uses a light-emitting device and a light-receiving device which establish sensing zones extending from the swing door into the air. German Patent No. 4,415,401 discloses a plurality of sensors disposed above a swing door. Each sensor has a light-emitter and a light-receiver, so that a plurality of sensing zones extending between the sensors and the floor are formed.

Guardrails may be installed near the path of the swing door. The system disclosed in German Patent No. 4,415,401 can detect small objects on or near the floor, but it may also detect the guardrails, so that the swing door may be unnecessarily stopped in response to detection of the guardrails. Therefore it is desirable that no irrelevant objects be sensed, in order to ensure the stable door operation.

Further, it is desirable that when a moving object as well as a guardrail come to enter into a sensing zone, only the moving object be detected, and the guardrail be not detected, so that the door is not stopped in response to detection of the guardrail, and, therefore, the moving object can pass through the doorway swiftly. According to the technology disclosed in U.S. Pat. No. 4,560,912, the position of the sensing zones may be properly determined in such a manner as to prevent the sensing of the guardrail by the sensor, which could undesirably stop the swing door. However, the system of U.S. Pat. No. 4,560,912 sometimes cannot detect a small object, e.g. an infant, on or near the floor. It is, therefore, desired to provide a sensing system which does not detect irrelevant objects but detects only relevant objects.

Swing doors may be installed in a variety of environments. Accordingly, in order to ensure proper operation of a swing door, the amount of light emitted by light-emitters of a sensor and the amount of light received by light-receivers must be adjusted to values suitable for the environment in which the swing door is installed. It is desirable that such adjustment be done automatically.

The environmental condition in which a door is installed may vary with time. It is also desired that the sensor be adjusted automatically with changes in the environment.

The speed of the door when it rotates is higher at the distal edge of the door remote from rotation center than at portions nearer to the rotation center. Accordingly, if an object collides with the distal edge of the door, the object may be damaged severely. Therefore, it is desired that an object in the sensing zone adjacent to the distal edge of the door be sensed without fail.

An object of the present invention is to ensure stable operation of an automatic swing door.

Another object of the present invention is to provide a system which senses only a moving object.

Still another object of the present invention is to make a sensing zone adapt itself to difference and changes in environment where the automatic swing door is installed.

A further object of the present invention is to improve the sensing precision in a sensing zone near the swing door portion which moves at a high speed.

SUMMARY OF THE INVENTION

According to a first feature of the present invention, an object sensor system includes sensors mounted on the approach and swing sides of an automatic swing door, respectively. Each of the sensors includes a light-emitter and a light-receiver. The light-emitter emits a pulse of light toward a floor and the light-receiver receives the pulse of light as reflected from the floor, whereby a sensing zone is formed. The shape of the sensing zone on the floor is a rectangle having a width equal to or larger than the width of the door. The sensing zone includes a main sensing area closer to the swing door, and an auxiliary sensing area adjacent to the main sensing area. The auxiliary sensing area is disabled when the swing door moves.

Since the auxiliary sensing area is disabled when the swing door is moving, an object in the auxiliary sensing area is prevented from being sensed when the door is moving, and, therefore, the door is not stopped, deceleratd or reversed in its moving direction, so that a stable door operation can be ensured. On the other hand, since the auxiliary sensing area is operable when the door is in its fully opened position or in the closed position, the presence of objects in a wide range can be detected, so that collision of an object with the swing door can be avoided and the safety of objects is ensured.

According to a first aspect of the first feature, each of the main and auxiliary sensing areas includes a plurality of sub-areas, and part of the sub-areas is disabled in accordance with the width of a particular swing door on which the sensing system is mounted.

Since part of the sensing sub-areas of the main and auxiliary sensing areas can be selectively disabled, the sensor system of the present invention can be used with swing doors having different widths, while providing sensing areas appropriate for the width of a particular swing door, so that the sensors do not sense objects in regions beyond the side edges of the door, which ensures a stable operation of the swing door.

According to a second aspect of the first feature, the dimension of the main sensing area in the direction perpendicular to the swing door is such that when an object is sensed, the door can be fully braked before it collides with the object.

The automatic swing door is braked for, for example, deceleration or stop when an object is sensed in the main sensing area. According to the second aspect, the braking of the door is effected before the swing door collides with the object. Thus, the safety of objects is ensured.

According to a third aspect of the first feature, the main sensing area of a sensor mounted on the swing-side of the swing door includes a plurality of sub-areas, which are successively disabled during the opening operation of the door, with the sub-area closest to the rotation center of the door disabled first.

Thus, the size of the main sensing area on the swing-side is successively reduced as the door is opened, from the largest when the door is in its fully open or closed position. Thus, the sensor does not sense irrelevant objects, whereby a stable operation of the door is ensured.

According to a fourth aspect of the first feature, the sensor on the approach-side of the swing door has its main and auxiliary sensing areas enabled when the door is in the fully opened position, with the auxiliary sensing area disabled during the closing operation of the door.

Because the main and auxiliary sensing areas of the approach-side sensor are enabled when the door is in the fully opened position, a wide sensing zone is provided to ensure the safety of objects. In addition, because the auxiliary sensing area is disabled during the closing operation of the door, an object which would not collide with the door is not sensed, so that unnecessary stop, deceleration, and reverse movement of the swing door can be prevented to ensure a stable door operation.

According to a fifth aspect of the first feature, one or more sub-areas are added to the main and/or auxiliary sensing areas of approach-side sensor in a region beyond the distal edge of the door when the door is in its fully opened position.

Since one or more sub-areas are added when the door is in its fully opened position, a wide sensing zone is formed to ensure the safety of objects.

According to a sixth aspect of the first feature, an approach-side sensor is mounted on each of double swing doors, and one or more sub-areas of the main sensing area of the approach-side sensor near the distal edge of each door are disabled throughout the closing operation or when the door approaches the closed position.

It is not likely that double swing doors close in synchronization with each other, and, therefore, the distal edge of one door may be undesirably sensed by the sensor on the other swing door. Such undesirable sensing can be prevented by employing the sixth aspect according to which one or more sub-sensing areas near the distal edges of the swing doors are disabled, so that a stable operation of double swing doors can be ensured.

According to a seventh aspect of the first feature, a sensor provides a generally right-pyramidal sensing zone of which shape projected on the floor is rectangular.

Since a single sensor provides a right-pyramidal sensing zone which extends in the air from the sensor to the floor, any objects in this zone can be sensed without fail, so that the safety of objects can be ensured.

An object sensor system according to a second feature of the present invention includes sensors mounted on the two sides of an automatic swing door. Each of the sensors includes a light-emitter and a light-receiver. The light-emitter emits a pulse of light toward a floor at a respective one of positions of the moving door, and the light-receiver receives the pulse of light as reflected from the floor, whereby a sensing zone of the sensor is formed. The light-receiver develops an output value corresponding to the amount of light received by the light-receiver at a respective one of the door positions. A reference value is formed from the output value corresponding to the amount of light received at each door position when no moving object is present in the sensing zone. The output value from the light-receiver developed during the normal operation of the swing door is referred to as object-sensing received-light representative value as distinguished from reference value which is also representative of received light when no moving object is present in the sensing zone. The object-sensing received-light representative value is compared with the reference value.

Since the object-sensing received-light representative value developed in the absence of a moving object or, in other words, in the presence of only a stationary object is used as a reference value, only moving objects can be sensed and, therefore, the door is not unnecessarily reversed in moving direction, stopped or decelerated. Thus, a stable swing door operation is ensured.

According to a first aspect of the second feature, the light-emitter emits a succession of a predetermined number of pulses of light at each door position, and the average of the amounts of light of the pulses as reflected from the sensing zone and received by the light-receiver is developed as an output value from the light-receiver.

Generally speaking, even if the same amount of light is emitted in a number of times, it is rare that the same amount of light is always received even under the same condition because of variations of circuits of the light-emitter and the light-receiver. According to the first aspect of the second feature, a predetermined number of pulses of light are successively emitted, received and measured, and the average amount of received light in the predetermined number of pulses, rather than one pulse of light, is used as the reference value to correct for measurement errors, so that the correctness of the reference value is improved, whereby only moving objects can be sensed with precision.

According to a second aspect of the second feature, the light-emitter emits a succession of a predetermined number of pulses of light, and the average of the amounts of light of the predetermined number of pulses as reflected from the sensing zone and received by the light-receiver, except the largest and/or smallest ones of the amounts of received light, is developed as an output value of a light-receiver.

Among output values of a light-receiver, there may be largest and smallest values due to disturbance by solar light, noise and the like, which degrades the preciseness of the reference value. According to the second aspect, one or both of largest and smallest ones of the amounts of received light are discarded, and the remaining ones are averaged and developed as an output value of the light-receiver. Accordingly, only a moving object can be detected with higher precision.

According to a third aspect of the second feature, the light-emitter emits a succession of a predetermined number of pulses of light, and the light-receiver receives the pulses of light as reflected from the sensing zone. The amount of light of the first one of the succession of emitted pulses, reflected from the sensing zone and received by the light-receiver is discarded, and the amounts of light of the second and succeeding pulses as received by the light-receiver are arithmetically processed and provided as an output value of the light-receiver.

The amount of light in the first emitted pulse out of the predetermined number of successive light pulses emitted and received by the light-receiver has often a lower precision because of instability of the light-emitter circuit and the light-receiver circuits. According to the third aspect, therefore, the first emitted pulse is ignored to improve the preciseness of the reference value, and, thereby enable detection of only moving objects with high precision.

According to a fourth aspect of the feature, the light-emitter emits a succession of a predetermined number of pulses of light, and largest and/or smallest ones of the amounts of light received by the light-receiver are discarded. In addition, the light-emitter of one sensor emits pulses of light at different time intervals from the light-emitters of other sensors.

In case that a plurality of swing doors with sensors are used, light emitted by the light-emitters of the sensors may interfere with each other, so that light reflected from the sensing zone of the sensor on one swing door may be received by the light-receivers on other swing doors. According to the fourth aspect, the time intervals at which light pulses are emitted by one light-emitter are made different from the time intervals at which other light-emitters emit light pulses, and, in addition, the largest and/or smallest amounts of received light in each sensor are discarded, while the average amount of the received light in the remaining pulses is used as the reference value. Thus, influence of intereference can be avoided.

According to a fifth aspect of the second feature, the light-emitter emits a predetermined number of pulses of light successively at time intervals different from the time intervals at which the light-emitter of another sensor emits light pulses. When the difference between largest and smallest amounts of received light in the pulses is equal to or larger than a predetermined value, the received light is all ignored.

If the difference between largest and smallest amounts of light in the received pulses is equal to or larger than a predetermined value when a first swing door with the sensor mounted thereon is activated, it may indicate that the sensor of another swing door is operating and interferes with the sensor of that swing door, and, therefore, the preparation of the reference value or the sensing operation is interrupted. It may be probable that two or more sensors are interfering, but preparation of erroneous data based on such interference is avoided by discarding the data.

According to a sixth aspect of the second feature, the sensor includes a plurality of light-emitters and one or more light-receivers, or one or more light-emitters and a plurality of light-receivers, so that the sensing zone comprises a plurality of sub-areas. The number of the sub-areas is equal to the larger one of the numbers of the light-emitters and light-receivers used. An amount of light received is measured for each of the sub-areas.

Because an amount of light received is measured for each sub-area, the system can appropriately operate for the respective ones of the sub-areas and, therefore, the sensing of only objects can be effected with precision.

According to a seventh aspect of the second feature, a large number of light-emitters and light-receivers are used to form a sensing zone including a corresponding number of sub-areas, and two or more of the light-receivers are selectively operated simultaneously to receive light.

When the amount of light received at a respective one of the selected light-receivers is successively measured, the light-receiver the amount of light received by which is measured at a later time has been already activated and has been stablilized in operation. In addition, since influence of transition on the amount of received light caused by the selecting operation disappears when measurement of the amount of received light is done. Accordingly, measurement of received light can be done immediately, so that the time required for measurement can be shortened.

According to an eighth aspect of the second feature, the sensor includes a plurality of light-emitters and one or more light-receivers, or one or more light-emitters and a plurality of light-receivers, so that the sensing zone comprises a plurality of sub-areas. These sub-areas are successively formed.

According to the eighth aspect, it never occurs that all of the light-emitters and all of the light-receivers are simultaneously operated, and, therefore, power required for sensing objects in the sub-areas can be smaller.

According to a ninth aspect of the second feature, the sensor includes one or a plurality of light-emitters and a plurality of light-receivers, and the sensing zone includes sub-areas as many as the light-receivers. The amounts of light received from a plurality of adjacent sub-areas are averaged, and an average value is stored in a memory as the received-light representative value for each of the adjacent sub-areas.

According to the ninth aspect, one stored value can be used as the reference value for a plurality of adjacent sub-areas. In other words, one reference value can be used for a plurality of adjacent sub-areas. Thus, with the same memory capacity, reference values for a larger number of door positions can be set.

According to a third feature of the present invention, a sensor system includes sensors each including a light-emitter and a light-receiver which are mounted on a swing door. The light-emitter emits a pulse of light onto a floor and the light-receiver receives the pulse of light as reflected from the floor, whereby a sensing zone is formed. The received-light representative value at a respective one of door positions when no moving object is in the sensing zone is used as a reference value. A dead zone is provided which extends from the reference value to a limit value above and/or below the reference value.

The width of the dead zone can be adjusted for the adjustment of the sensitivity and stability of the sensor.

According to a first aspect of the third feature, when the object-sensing received-light representative value resulting from the sensing of the absence of an object in a sensing zone during the normal operation of the door is within the dead zone, the object-sensing received-light representative value is compared with the reference value, and the limit value is adjusted in accordance with the result of comparison.

When the object-sensing received-light representative value resulting from the sensing of the absence of an object in the sensing zone during the normal operation of the door is within the dead zone, the sensor judges that there is no object in the sensing zone. The environment of the sensor, e.g. the weather, may change, and if no measures are taken against such environmental changes, the sensor may generate a signal as if it had sensed a nonexistent object, which causes the door to open. In order to prevent this to occur, according to the first aspect of the third feature, the object-sensing received-light representative value resulting from the sensing of the absence of an object in the sensing zone during normal operation of the door is compared with a reference value to detect a change of the environment. If a change of the environment is detected, the limit value is changed by an amount determined in accordance with the object-sensing received-light representative value during normal operation of the door system to thereby adjust the width of the dead zone, so that erroneous operation of the door is prevented. The amount by which the limit value is changed may be determined by the result of comparison of the object-sensing received-light representative value and the reference value, e.g. the difference between them.

According to a second aspect of the third feature, when the object-sensing received-light representative value resulting from the absence of an object in the sensing zone during normal operation of the door is within the dead zone(s), the limit value(s) is adjusted in accordance with the object-sensing received-light representative value, as in the first aspect.

The adjustment of the limit value(s) may be done by setting a new reference value which is equal to the object-sensing received-light representative value multiplied by a predetermined coefficient, and adding or subtracting a predetermined value to or from the new reference value to form a new limit value, or by adding and subtracting a predetermined value to and from a new reference value to form new limit values.

According to a third aspect of the third feature, the limit value is adjusted in accordance with the object-sensing received-light representative value for each door position during the closing operation of the door.

It is highly possible that there is no moving object in the sensing zone when the door is in closing operation, and, therefore, it is less possible that the limit value may be erroneously adjusted. According to the third aspect, therefore, the limit value adjustment is carried out during closing operation of the door.

According to a fourth aspect of the third feature, when the object-sensing received-light representative value resulting when the door is at the closed position is within the dead zone, the received-light representative value is compared with the reference value. The limit value defining the dead zone at each door position is adjusted in accordance with the result of the comparison.

According to the fourth aspect, if the comparison of the received-light representative value in the closed door position with the reference value indicates a change in the environment in the closed door position, it is considered that there should be an environmental change at the remaining door positions, too, and the limit values for the respective door positions are also adjusted. Since the time in which the door is in the closed position is longer than the time period in which the door is in the closing operation, in the opening operation, or in the fully opened position, a change in the environment can be detected best when the door is in the closed position. Thus, if an environmental change is detected at the closed position, it is justifiable to predict that an environmental change may have been occurred in the remaining door positions, and, accordingly, the limit values for the respective door positions are also adjusted.

According to a fifth aspect of the third feature, when the object-sensing received-light representative value developed when the door is in its closed position is within the dead zone, the limit value for the closed position is adjusted in accordance with the amount of received light.

The door is in its closed position for a longer time than it is in the opening operation, in the closing operation and in the fully opened position. Accordingly, it may be sufficient to adjust the limit value only at the closed position.

According to a sixth aspect of the third feature, if the object-sensing received-light representative value resulting from receiving light from the sensing zone is and remains out of the dead zone for a predetermined time, the limit value is corrected.

When the object-sensing received-light representative value is out of the dead zone, it is judged that an object is present in the sensing zone. If, for example, the swing door is arranged to stop when a sensor senses an object, it can be judged that it is a stationary object that is present in the sensing zone when the sensor senses that an object is present in the sensing zone for a predetermined time. Accordingly, the limit value is adjusted in such a manner that the object-sensing received-light representative value developed in this condition can be within the dead zone, whereby the swing door can operate smoothly.

According to a seventh aspect of the third feature, when the object-sensing received-light representative value is outside the dead zone and remains substantially at a constant value for a predetermined time, the limit value is corrected.

If the object-sensing received-light representative value remains at a substantially constant value outside the dead zone for a predetermined time, it is judged that a stationary object, e.g. a doormat or a flower pot, is present in the sensing zone, and, therefore, the limit value is corrected accordingly, so that smooth and stable operation is ensured.

According to an eighth aspect of the third feature, when a condition that the object-sensing received-light representative value is outside the dead zone is repeated a predetermined number of times at substantially the same position, i.e. the closed position or one of the other door positions, excluding the fully opened position, the limit value is adjusted.

When the object-sensing received-light representative value is outside the dead zone, it is judged to indicate that an object is present in the sensing zone. Let it be assumed that the swing door is, for example, of a type that reverses the direction of swing or decelerates when a sensor senses an object. If such swing door repeats reversal in moving direction or deceleration at the same door position, it may be judged that a stationary object is present in the sensing zone. In such a case, according to the eighth aspect, the limit value is corrected in such a manner that the object-sensing received-light representative value in the presence of the stationary object can be within the dead zone, whereby smooth and stable operation of the swing door is ensured.

According to a fourth feature of the present invention, a sensor includes a light-emitter and a light-receiver which are mounted on a swing door. The light-emitter emits a pulse of light onto a floor and the light-receiver receives the pulse of light as reflected from the floor, to thereby form a sensing zone. A controller having a response range controls the light-emitter and the light-receiver. A reference value is formed from the received-light representative values developed at each door position in the absence of an object in the sensing zone, and a dead zone is provided above and/or below the respective reference values. The dead zone is defined by limit values which are normally within the response range of the controller. When the limit value defining the dead zone as determined in accordance with received-light representative values developed in the absence of a moving object in the sensing zone is outside the response range of the controller, the controller operates to change the limit value in such a manner that the limit value is located in the response range.

The controller has a response range within which a received-light representative value developed by the sensor corresponds to the amount of light received. However, if the amount of light received is too large, the received-light representative value is limited to the upper limit of the response range of the controller, and, if the amount of light received is too small, the received-light representative value is limited to the lower limit of the response range. Without this arrangement, depending on the environment in which the sensor is installed, the dead-zone defining limit value set in accordance with the amount of light received could be outside the response range, and precise detection of an object could not be done. In order to avoid it, according to this feature, the limit value is controlled to be located in the response range. This control may be provided by, for example, adjusting the amount of light to be emitted by the light-emitter, adjusting the amount of light to be received by the light-receiver, or by adjusting the gain of an amplifying unit which amplifies the amount of light received by the light-receiver and applies it to the controller.

According to a first aspect of the fourth feature, the controller controls the amount of light to be emitted by the light-emitter in such a manner that the limit value is within the response range of the controller.

According to a fifth feature of the present invention, a sensor including a light-emitter and a light-receiver is mounted at a location in the upper portion of a swing door. The light-emitter emits a pulse of light onto a floor and the light-receiver receives the pulse of light as reflected from the floor, whereby a sensing zone is formed. The light path along which emitted light from the light-emitter to the floor or reflected light from the floor to the light-receiver travels is shorter on the distal edge side of the door than on the rotation axis side of the door.

If the light paths on the distal edge side and the rotation axis side along which the emitted or reflected light follows are equal, or if the path on the distal edge side is longer than the light path on the rotation axis side, with the area of the sensing zone on the floor being the same, the edge of the sensing zone on the distal edge side of the door at a given level above the floor is displaced toward the rotation axis of the door. This means that the height of the sensing zone on the distal edge side of the door is reduced.

According to the fifth feature, the light path on the distal edge side of the door is shorter than the light path on the rotation axis side, so that the edge of the sensing zone on the distal edge side at the above-stated level above the floor is closer to the distal edge of the door. Then, the height of the sensing zone on the distal edge side of the door increases, and, therefore, if an object, e.g. a person's head, enters into the door region from outside the distal edge side of the door at a level above the floor, it can be sensed by the sensor. Thus, the safety is improved in the distal edge side of the door where the door speed is high.

According to a sixth feature of the present invention, a sensor including a light-emitter and a light-receiver is mounted at a location in the upper portion of a swing door. The light-emitter emits a pulse of light onto a floor and the light-receiver receives the pulse of light as reflected from the floor, whereby a sensing zone is formed. The light path on the distal edge side of the door along which emitted light from the light-emitter to the floor or reflected light from the floor to the light-receiver travels crosses the distal edge of the door at a level approximately intermediate between the top and bottom edges of the door.

With this arrangement, the height of the sensing zone at the distal edge of the swing door increases, and, therefore, if an object, e.g. a person's head, enters into the door region from outside the distal edge side of the door at a level above the floor, it can be sensed by the sensor. Thus, the safety in the distal edge side of the door where the door speed is high is improved.

According to an aspect of the sixth feature, a sensor includes a plurality of light-emitters and one light-receiver, one light-emitter and a plurality of light-receivers, or a plurality of light-emitters and a plurality of light-receivers. A plurality of light pulses are emitted or received. The light intensity of emitted or received light per unit area increases from the rotation axis side toward the distal edge side of the door.

With this arrangement, a higher sensing accuracy is provided on the distal edge side of the door so as to ensure safety at the distal edge of the door which moves at a higher speed.

BRIEF DESCRIPTION OF THE DRAWINGS

FIGS. 15A and 15B shows various setting of the door sensor shown in FIG. 14 corresponding to states of DIP switches used in the sensor.

FIG. 16 shows states of light-receiver switching signals.

FIGS. 17(*a*) and 17(*b*) show reference values stored in a data memory unit shown in FIG. 14.

DETAILED DESCRIPTION OF THE INVENTION

Swing Door

Figure 2:
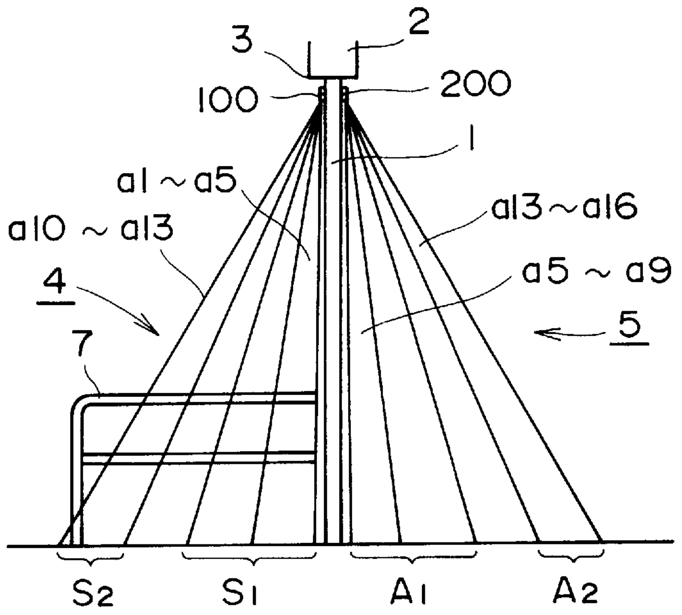
FIGS. 2(*a*), 2(*b*) and 2(*c*) are respectively a side view, a front view and a rear view of the swing door of FIGS. 1(*a*) and 1(*b*) with the sensor system mounted on it.
Figure 2:
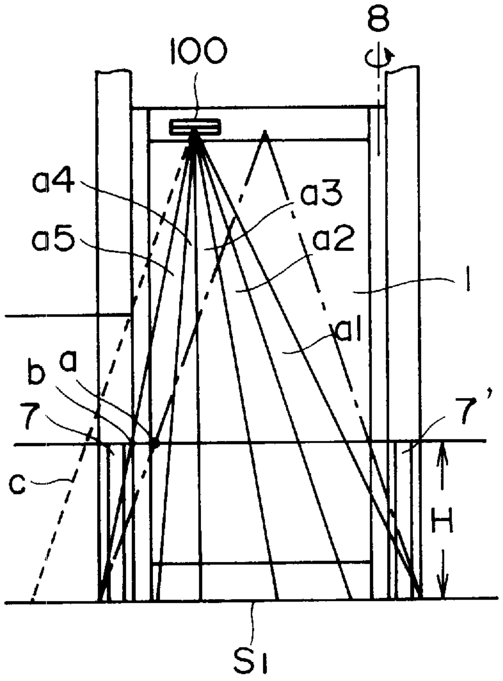
Figure 2:
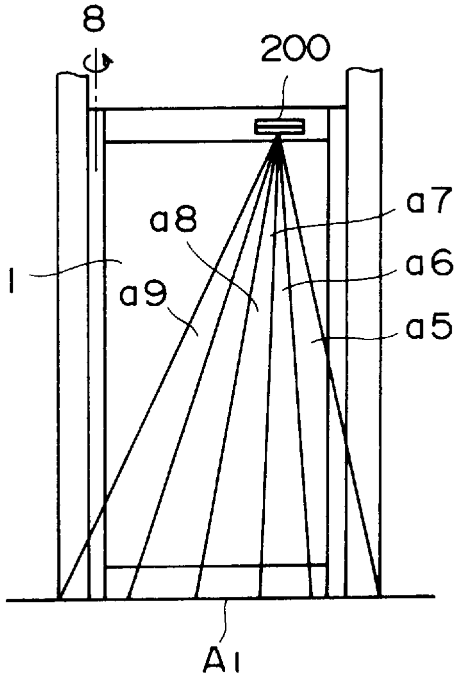
Figure 6:
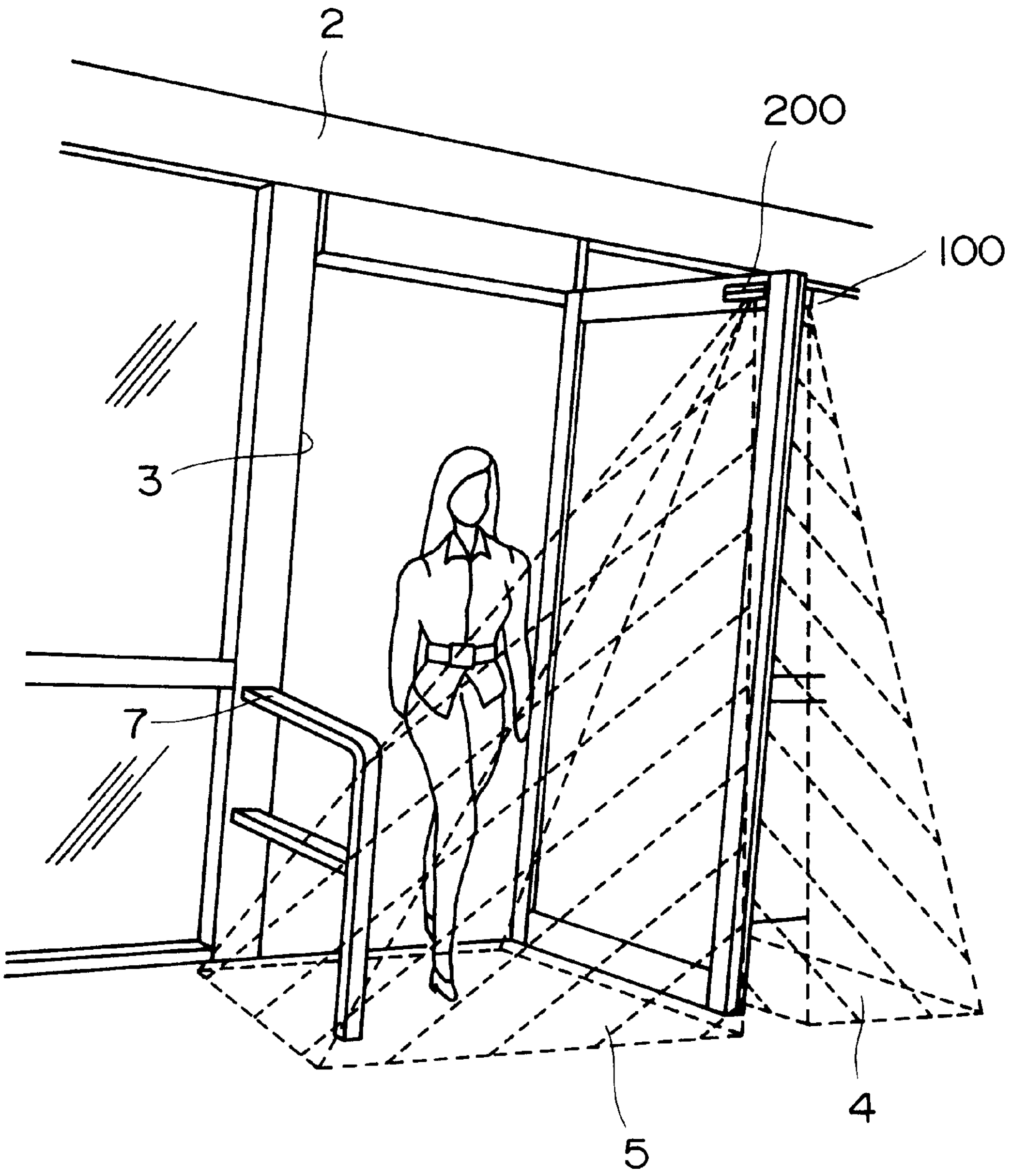
FIG. 6 is a perspective view of the swing door with the sensor system mounted on it.

An object sensor system of the present invention is mounted on a swing door. There are two types of swing door. One is a single swing door and the other is double swing doors. In FIG. 6, a single swing door is shown. The swing door 1 has a rectangular shape and opens and closes a doorway 3 defined by a door frame 2. As illustrated in FIGS. 2(*b*) and 2(*c*), th door 1 rotates or swings about a rotation axis 8 located on one vertical edge (i.e. proximal edge) of the door 1. When a moving object, e.g. a human, approaches to the swing door 1 and enters into a sensing zone formed at one side or approach side of the door 1, the door 1 swings in the direction toward the other or swing side, so that the doorway 3 is opened and the human can pass through it. After the human pass through the doorway 3, the door 1 swings back in the reverse direction (i.e. to the approach side) and closes the doorway 3. Guardrails 7 and 7' are installed to extend from opposing jambs in the swing side of the door to prevent another moving object from entering into the path in the swing side when the swing door swings.

Sensing Zones

If an object or human is in the path of the swing door 1 when the swing door 1 swings open, the door 1 may collide with the human. In order to prevent it, sensing zones 4 and 5 (FIG. 2(*a*)) for safety purpose are formed in the swing side and the approach side of the door 1. The sensing zones 4 and 5 move with the swing door 1. When the presence of an object in the sensing zone 4 or 5 is sensed, the swing door 1 stops, decelerates, or reverses.

The object sensor system of the present invention is used to form the sensing zones 4 and 5. The object sensor system includes a swing-side sensor 100 and an approach-side sensor 200 which are mounted on the swing side and the approach side of the door 1. The locations of the respective sensors 100 and 200 are on upper portions near the distal edges (i.e. the edges remote from the rotation axis 8) of the door 1 on the swing and approach sides, respectively.

Referring to FIG. 2(*a*), the sensing zone 4 includes a main sensing area S1 formed nearer to the door 1 and an auxiliary sensing area S2 spaced from the main sensing area S1 in the direction away from the door 1. Similarly, the sensing zone 5 includes a main sensing area A1 formed nearer to the door 1 and an auxiliary sensing area A2 spaced from the main sensing area A1 in the direction away from the door 1. Each of the sensing areas S1, A1, S2, and A2 has a pyramidal shape having a vertex at the sensor 100 or 200, and having a generally rectangular base on the floor. If an object or human enters into the space between the main sensing area S1, A1 and the auxiliary sensing area S2, A2, he or she can be sensed in a higher portion of the auxiliary sensing area S2 or A2. Since the floor surface portions are covered by the main sensing areas and the auxiliary sensing areas, low objects, such as dollies, can be sensed without fail.

Figure 3A:
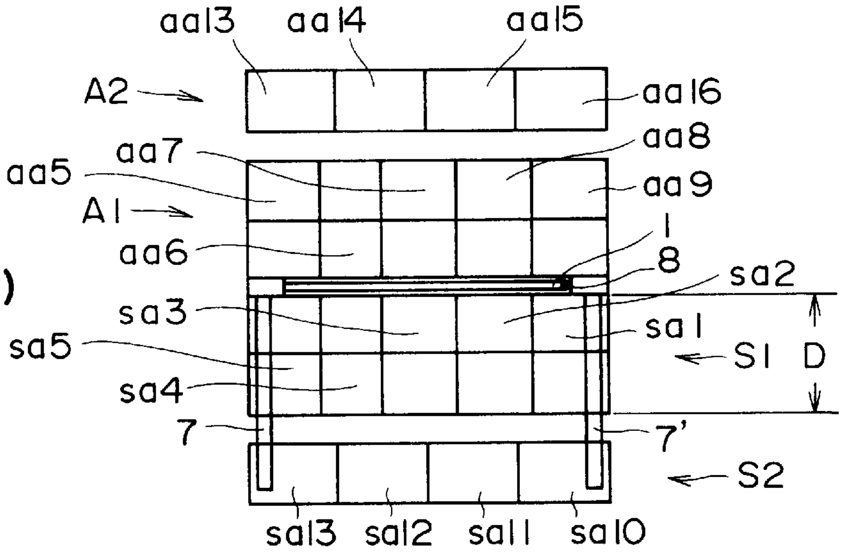
FIGS. 3(*a*), 3(*b*) and 3(*c*) illustrate how the width of the sensing zone is changed depending on the width of the swing door on which the sensor system of the present invention is mounted.
Figure 3B:
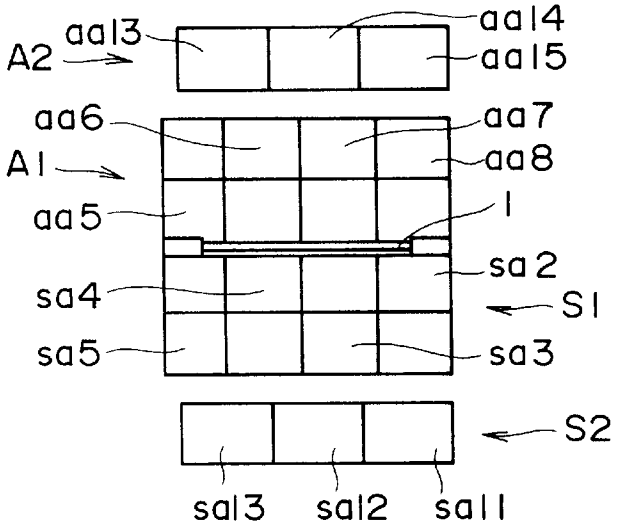
Figure 3C:
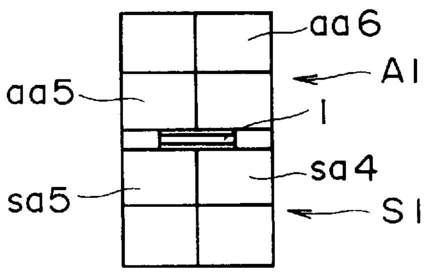

Each of the main and auxiliary sensing areas S1, A1, S2 and A2 includes a plurality of sensing sub-areas, as shown in FIG. 3(*a*). Each of the sub-areas is pyramidal with a generally rectangular base on the floor. The main sensing area S1 includes sub-areas sa1, sa2, sa3, sa4, and sa5 arranged in the named order from the rotation axis side to the distal edge side of the door 1, and the auxiliary sensing area S2 includes sub-areas sa10, sa11, sa12, and sa13 arranged in the named order from the rotation axis side to the distal edge side of the door. The approach-side main sensing area A1 includes sub-areas aa9, aa8, aa7, aa6, and aa5 arranged in the named order from the rotation axis side to the distal edge side of the door, and the auxiliary sensing area A2 includes sub-areas aa16, aa15, aa14, and aa13 arranged in the named order from the rotation axis side to the distal edge side of the door. In the illustrated example, the main and auxiliary sensing areas S1 and S2 are two rectangular areas when they are projected onto the floor, with a spacing disposed between them, but they may be formed by dividing one rectangular area by a diagonal. Similarly, the main and auxiliary sensing areas A1 and A2 may be formed by dividing one rectangular area by a diagonal.

Sensors 100 and 200

Figure 4:
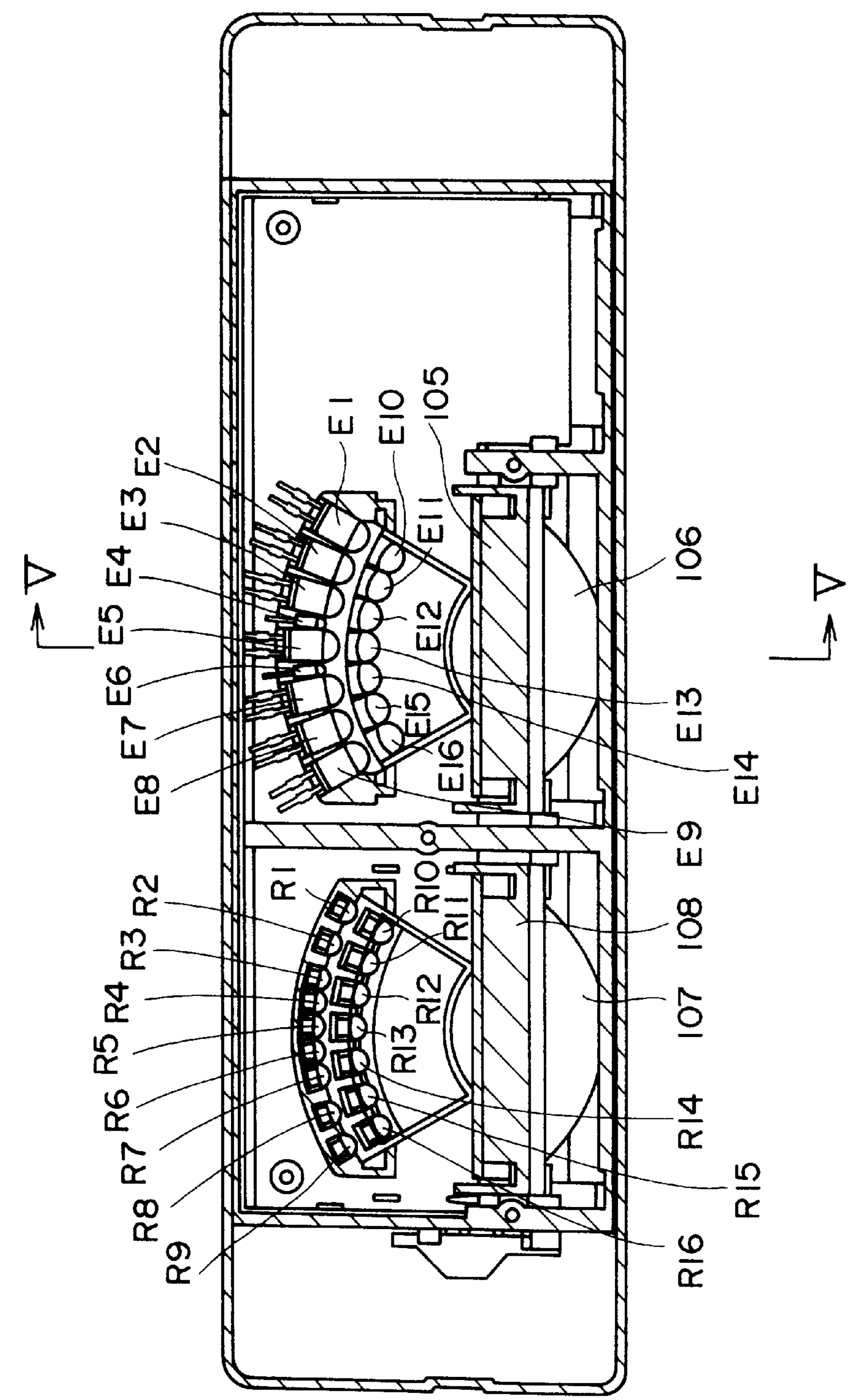
FIG. 4 is a cross-sectional, rear view of one of the sensors of the sensor system.
Figure 5:
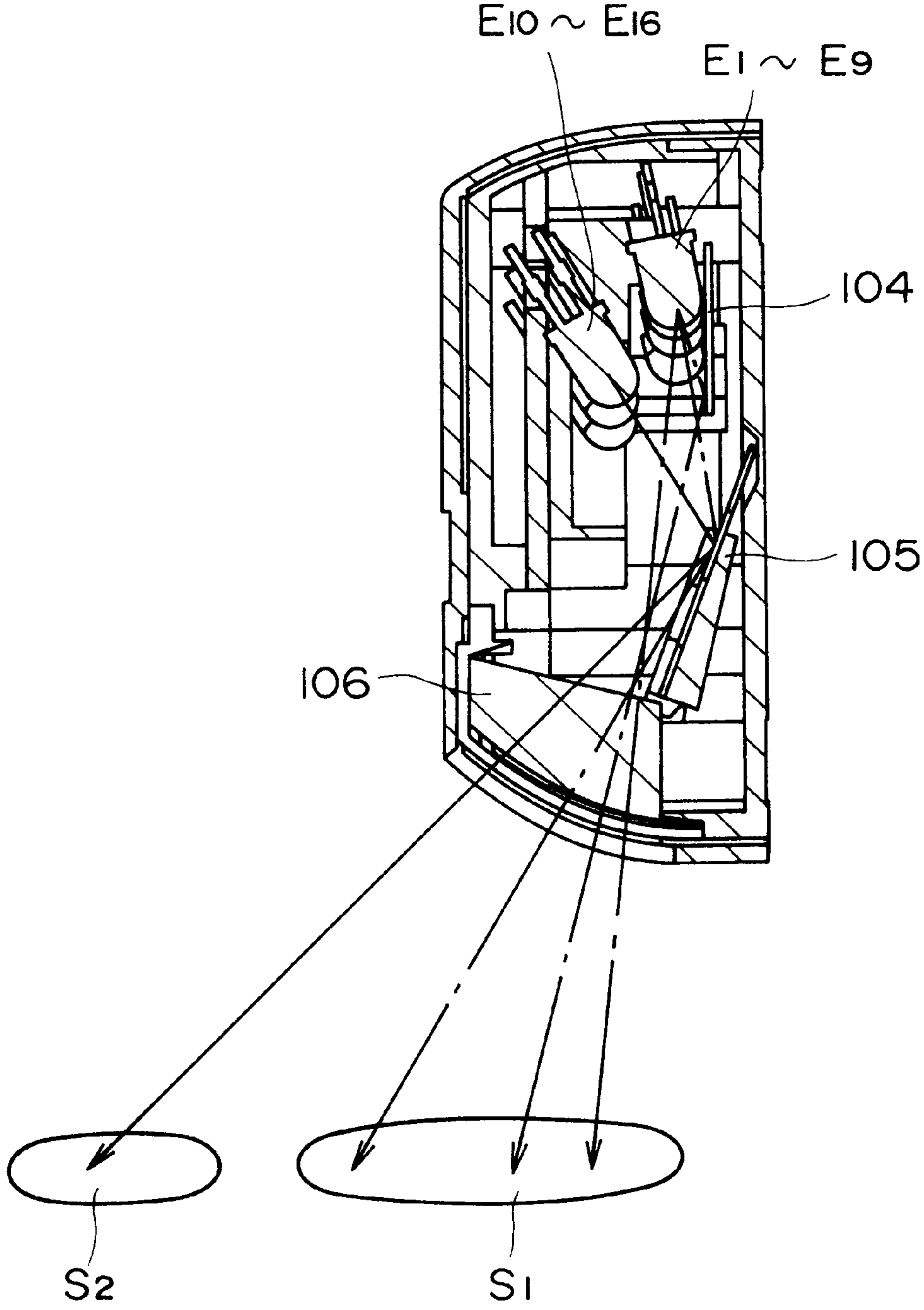
FIG. 5 is a cross-sectional view along the line V—V in FIG. 4.

The sensors 100 and 200 have the same arrangement. As shown in FIGS. 4 and 5, each of the sensors includes sixteen (16) light-emitters, e.g. infra-red light emitting diodes, E1–E16, and sixteen light-receivers, e.g. infra-red light receiving diodes, R1–R16. The light-emitters (sometimes referred to simply as emitters hereinafter) emit pulses of infra-red radiation toward the floor. As shown in FIG. 5, the light-emitters E1 through E9 are arranged to emit infra-red light pulses which impinge on a first reflector 104 which reflects the light pulses onto a second reflector 105. The light pulses reflected by the reflector 105 pass through a lens 106 and impinge on the floor. Infra-red light pulses from the light-emitters E10 through E16 are reflected by the reflector 105 and directed to pass through the lens 106 and impinge on the floor.

The light-receivers R1 through R9 receives the light pulses emitted from the light-emitters E1 through E9 and reflected from the floor. These light pulses pass through the lens 107. They are then reflected by a reflector 108 corresponding to the reflector 105 and another reflector (not shown) corresponding to the reflector 104, and are received by the light-receivers R1 through R9. The light-receivers R10 through R16 receive light pulses which are emitted by the light-emitters E10 through E16. These light pulses are reflected from the floor and pass through the lens 107 to the reflector 108. The light pulses reflected from the reflector 108 are received by the light-receivers R10 through R16.

Each of the light-emitters E1 through E16 emits and directs a light pulse to only one of predetermined regions which is associated with that light-emitter, and each of the light-receivers R1 through R16 receives a light pulse from only one of the predetermined regions which is associated with that light-receiver. One light-emitter projects a light pulse to a region from which one light-receiver receives a light pulse, and, thus, one substantially pyramidal sensing sub-area is formed.

For the swing-side sensor 100, the light-emitter E1 and the light-receiver R1 form a pair to provide the sub-area sa1, the light-emitter E2 and the light-receiver R2 form a pair to provide the sub-area sa2, the light-emitter E3 and the light-receiver R3 form a pair to provide the sub-area sa3, the light-emitter E4 and the light-receiver R4 form a pair to provide the sub-area sa4, and the light-emitter E5 and the light-receiver R5 form a pair to provide the sub-area sa5. The light-emitter E10 and the light-receiver R10 form a pair to provide the sub-area sa10, the light-emitter E11 and the light-receiver R11 form a pair to provide the sub-area sa11, the light-emitter E12 and the light-receiver R12 form a pair to provide the sub-area sa12, and the light-emitter E13 and the light-receiver R13 form a pair to provide the sub-area sa13. In other words, in the swing-side sensor 100, the light-emitters E1, E2, E3, E4 and E5 and the light-receivers R1, R2, R3, R4 and R5 provide the main sensing area S1, and the light-emitters E10, E11, E12 and E13 and the light-receivers R10, R11, R12 and R13 provide the auxiliary sensing area S2. The remaining light-emitters and light-receivers are not used.

For the approach-side sensor 200, the light-emitter E9 and the light-receiver R9 form a pair to provide the sub-area aa9, the light-emitter E8 and the light-receiver R8 form a pair to provide the sub-area aa8, the light-emitter E7 and the light-receiver R7 form a pair to provide the sub-area aa7, the light-emitter E6 and the light-receiver R6 form a pair to provide the sub-area aa6, and the light-emitter E5 and the light-receiver R5 form a pair to provide the sub-area aa5. The light-emitter E16 and the light-receiver R16 form a pair to provide the sub-area aa16, the light-emitter E15 and the light-receiver R15 form a pair to provide the sub-area aa15, the light-emitter E14 and the light-receiver R14 form a pair to provide the sub-area aa14, and the light-emitter E13 and the light-receiver R13 form a pair to provide the sub-area aa13. In other words, in the swing-side sensor 200, the light-emitters E9, E8, E7, E6 and E5 and the light-receivers R9, R8, R7, R6 and R5 provide the main sensing area A1, and the light-emitters E16, E15, E14 and E13 and the light-receivers R16, R15, R14 and R13 provide the auxiliary sensing area A2. The remaining light-emitters and light-receivers are not used.

FIG. 4 shows the sensor 100 or 200 viewed from the door side. In some figures including FIGS. 1(*a*) and 1(*b*) and FIGS. 3(*a*) through 3(*c*), the sub-areas sa1, aa1, . . . , of the main sensing areas S1 and A1 are shown divided into two by a line parallel with the door. These lines indicate that each of the light pulses are split into two by the reflectors 104 and 105.

It has been described that the light-emitters and the light-receivers are used in pair, but the number of the light-emitters and the number of the light-receivers need not be equal as long as a desired number of sub-areas can be formed. In an extreme case, one light-emitter or light-receiver may be used with light-receivers or light-emitters equal in number to the desired sub-areas.

Size of Sensing Areas Corresponding to Door Width

The sensors 100 and 200 can be used with doors of various sizes, as shown in FIGS. 3(*a*) through 3(*c*). If the width of the main and auxiliary sensing areas S1, A1, S2 and S2 remains the same for different widths of swing doors 1, matters which should not be sensed would be sensed. In order to prevent it, the number of sub-areas of the main and auxiliary sensing areas S1, A1, S2 and S2 in the region on the distal edge side of the door 1 is changed to adjust the width of the sensing areas depending on the width of the door 1 on which the sensors 100 and 200 are mounted, as shown in FIGS. 3(*a*), 3(*b*), and 3(*c*).

Specifically, in FIG. 3(*b*), each of the main sensing areas S1 and A1 of the swing-side and approach-side sensors 100 and 200, respectively, is formed by four sub-areas. For this purpose, the light-emitter E1 and/or the light-receiver R1 of each of the sensors 100 and 200 are disabled. Further, each of the auxiliary sensing area S2 and A2 of the sensors 100 and 200 is formed by three sub-areas, and, accordingly, the light-emitter E16 and/or the light-receiver R16 of each of the sensors 100 and 200 are disabled.

In the case shown in FIG. 3(*c*), only the main sensing areas S1 and A1 are enabled, each including only two sub-areas. For this purpose, the light-emitters and/or the light receivers of the swing-side sensor 100 other than the light-emitters E4 and E5 and the light-receivers R4 and R5 are all disabled. In the approach-side sensor 200, the light-emitter and/or the light-receivers other than the light-emitters E5 and E6 and the light-receivers R5 and R6 are disabled. In FIG. 3(*c*), since the auxiliary areas are disabled, the size of the sensing zones of the sensors 100 and 200 are reduced also in the direction perpendicular to the door 1.

Mounting Locations of Sensors 100 and 200

As shown in FIGS. 2(*b*) and 2(*c*), the locations where the sensors 100 and 200 are mounted on the door 1 are nearer to the distal edge of the door 1. Accordingly, the length of the light path extending between the sensor 100, 200 and the floor along which the light pulse from the sensor which is closest to the distal edge of the door 1 follows and the length of the light path extending between the floor and the sensor 100, 200 along which the light pulse reflected from the floor which is closest to the distal edge of the door 1 follows are shorter than those of the light paths closest to the rotation axis 8, as shown in FIG. 2(*b*).

Let it be assumed that the sensor 100, 200 is mounted at the location intermediate between the distal edge and the rotation axis side edge of the door 1, being modified to cover an area on the floor which is equal to the area to be covered by the sensor when it is at the location nearer to the distal edge of the door. Then, the lengths of the light paths closest to the distal edge and the rotation axis side edge of the door 1 are substantially equal, as indicated by dot-and-dash lines in FIG. 2(*b*). In this case, at a height H from the floor at which the top of the guardrail 7 on the distal edge side of the door 1 is located, the sensor can sense an object when it is at a point "a" which is nearer to the center of the door. On the other hand, the sensor disposed at a location nearer to the distal edge of the door 1 can sense an object at a location "b" which is nearer to the guardrail 7, so that greater safety is secured.

Sensing at a higher position in a swing-side region near the distal edge of the door 1 may be available by using light-emitters and light-receivers, e.g. the light-emitter E14 and the light-receiver R14 so that the light pulse emitted or received intersects the distal edge of the door 1 at an intermediate height as indicated by a broken line "c" in FIG. 2(*b*). With this arrangement, a head of a human projecting into the door region over the guardrail 7 can be sensed, which improves the safety. A similar arrangement can be employed for the approach-side sensor 200.

Change of Sensing Zones with Movement of Swing Door 1

Figure 1:
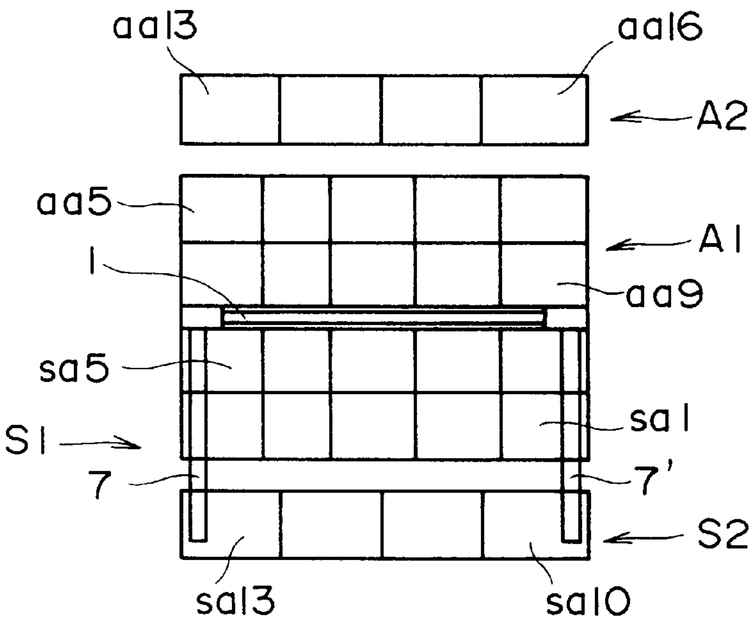
FIGS. 1(*a*) and 1(*b*) are plan views of sensing zones formed by a sensor system for a swing door according to a first embodiment of the present invention when the door is in its closed position and in a position a little time after it starts opening, respectively.
Figure 1:
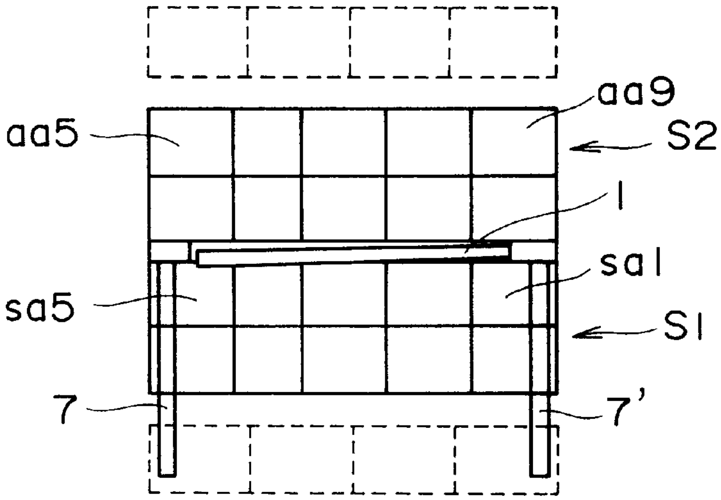

As shown in FIG. 1(*a*), when the door 1 is in the closed position, the main sensing areas S1 and A1 and the auxiliary sensing areas S2 and A2 are enabled so as to provide wide sensing zones for the swing-side and approach side regions of the door 1.

When the door 1 is opened by an angle of, for example, two degrees as shown in FIG. 1(*b*), the auxiliary sensing areas S2 and A2 are disable. If they were kept enabled, the auxiliary sensing areas S2 and A2 would sense an object m1 or m2, shown in FIG. 7(*a*), at such a distance that the door would not collide with them. This would cause the door 1 to stop moving, decelerate or reverse in motion, so that smooth passage from the approach side through the doorway would be hindered. It is avoided by disabling the auxiliary sensing areas S2 and A2.

Figure 7A:
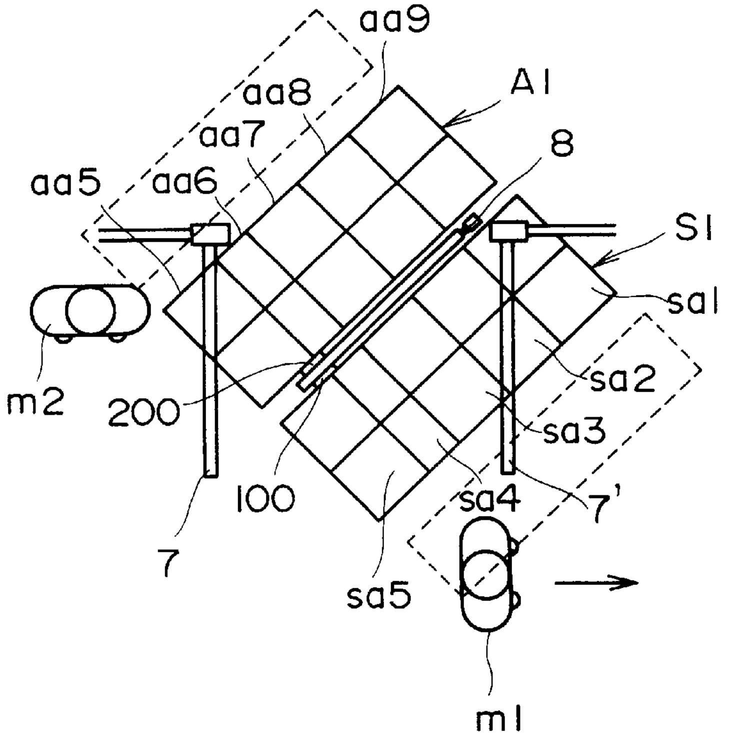
FIGS. 7(*a*) and 7(*b*) are plan views of the sensing zones formed by the sensor system when the door is being opened and when the door is in its fully opened position, respectively.
Figure 7B:
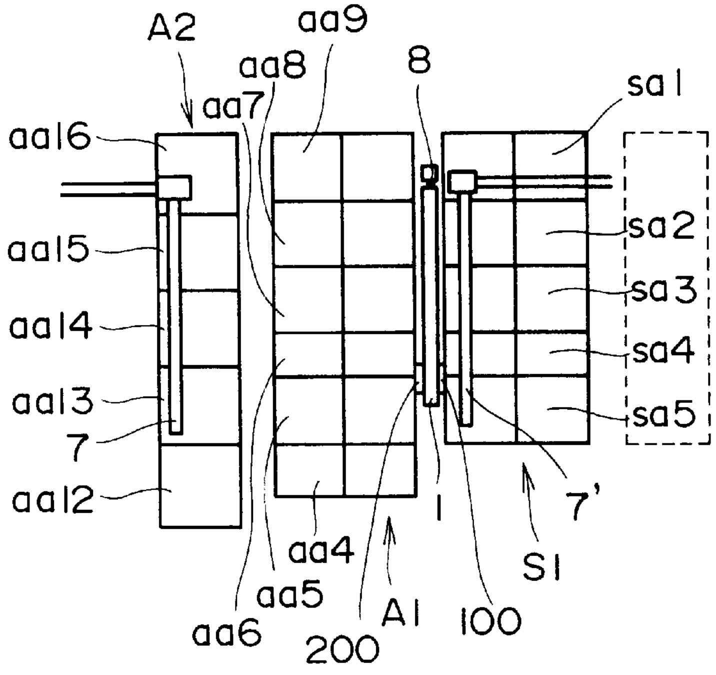
Figure 8A:
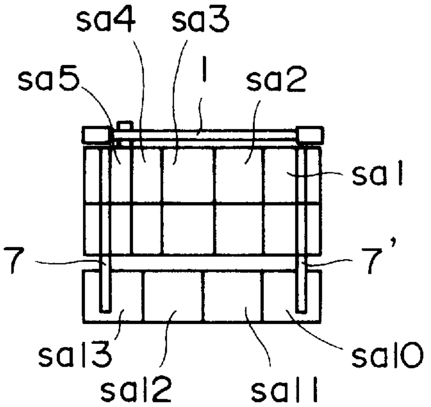
FIGS. 8(*a*) through 8(*f*) are plan views illustrating the main sensing area of the swing-side sensor of the sensor system which changes as the swing door swings.
Figure 8B:
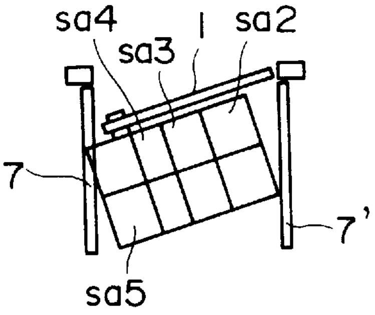
Figure 8C:
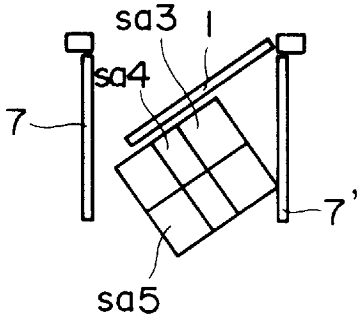
Figure 8D:
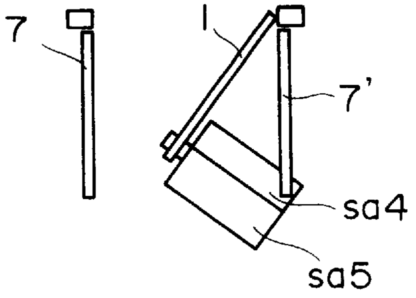
Figure 8E:
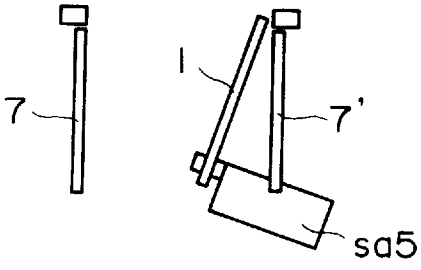
Figure 8F:
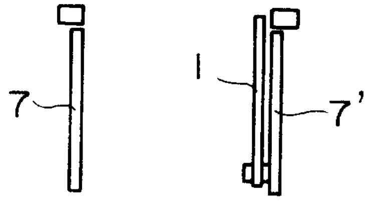

Even with the auxiliary sensing areas S2 and A2 disabled, the sensing sub-area sa1 of the main sensing area S1 is effective as shown in FIG. 7(*a*), and, therefore, an object, e.g. human who is standing outside near to the guardrail 7' on the rotation axis side of the door 1 can be effectively sensed, so that the swing door 1 can be stopped, decelerated or reversed. Thus, the possible collision of the door with the human can be avoided.

On the other hand, if a wall of the room, for example, is outside the guardrail 7', it is almost unnecessary to form a sensing area outside the guardrail 7'. In such a case, as shown in FIGS. 8(*a*) through 8(*f*), the sub-areas are successively disabled from the ones nearest to the rotation axis 4, as the door 1 swings. For example, when the swing door 1 is at an angle of about 40 degrees, the sub-area sa1 is disabled. When the door 1 is at an angle of 50 degrees, the sub-area sa2 is disabled in addition to the sub-area sa1. At an angle of 70 degrees, the sub-area sa4 is additionally disable, and at an angle of 80 degrees, the sub-area sa5 is further disabled. The disabling of the sub-areas in response to the rotation of the door 1 is performed by area control processing which will be described later, when an area disabling mode is selected as will be also described later.

When the door 1 has been opened by 90 degrees, i.e. when the door 1 is in the fully opened position, as shown in FIG. 7(*b*), the approach-side auxiliary sensing area A2 is enabled to make it possible to sense the presence of an object in a region near the guardrail 7, e.g. a human standing near the guardrail 7. At the same time, the light-emitter E4 and the light-receiver R4 of the approach-side sensor 200 are enabled to form additional sub-areas aa4 and aa12. The re-enablement of the auxiliary sensing area A2 and the addition of the sub-areas aa4 and aa12 provide a larger sensing zone in the approach side when the door is in the fully opened position, and, thus, a higher safety is ensured.

FIG. 7(*b*) shows the door system when the area disabling mode is not selected, and, therefore, the swing-side main sensing area S1 is effective even when the door 1 is in the fully open position. If the area disabling mode is selected, the area S1 is also disabled. Instead of forming the two sub-areas aa4 and aa12, only one of them may be formed.

When the door 1 returns to the closed position from the fully opened position, it moves through the reverse process to the position shown in FIG. 1(*a*). Specifically, during the closing process, the auxiliary sensing area A2 of the approach side is disabled again. If the auxiliary sensing area A2 remained effective, it would sense the presence of a human m2 near the guardrail 7 shown in FIG. 7(*a*), which would cause the door 1 to return to the fully opened position and, then, rotate toward the closed position. Then, the sensor would detect the human m2 again, and the door 1 would return to the fully opened position again. The door would repeat this closing and opening motion until the human m2 moves out of the sensing area A2. In order to avoid it, the auxiliary sensing area A2 is disabled. The auxiliary sensing area A2 is enabled again when the door returns to the closed position.

As for the swing-side sensing zone, when the area disabling mode is selected, the sub-areas of the main sensing area S1, which have been disabled, are successively restored from the one nearest to the distal edge of the door toward the rotation axis side one, as the door rotates to approach the closed position. All of the sub-areas of the main sensing area S1 are enabled when the door 1 is in the closed position, and the auxiliary sensing area S2, which has been disabled, is enabled again in the closed position of the door 1.

Figure 9:
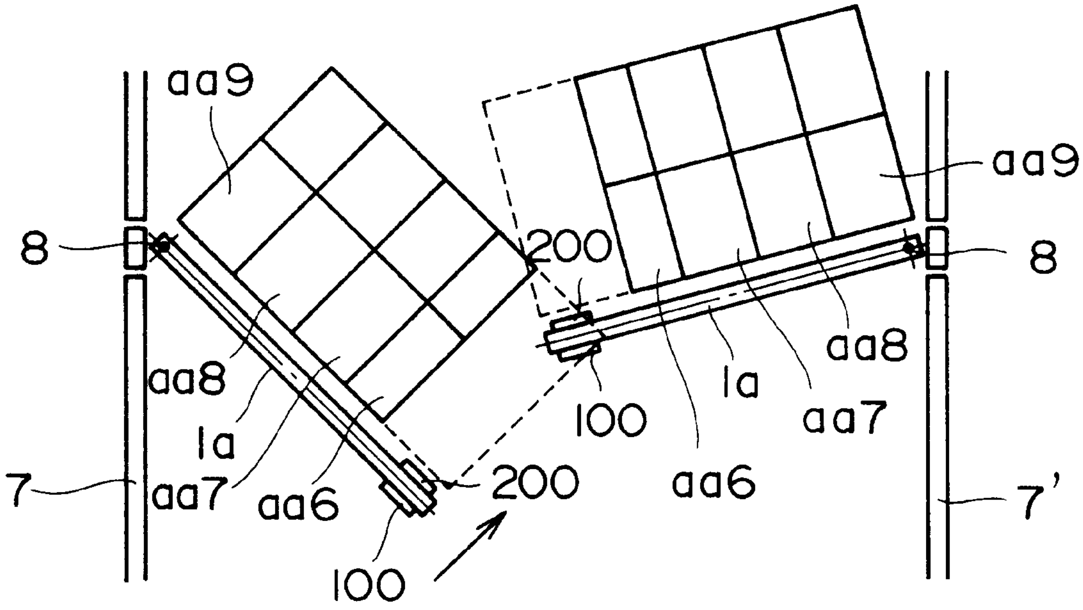
FIG. 9 is a plan view illustrating changes of the sensing areas formed by the approach-side sensors of the sensor systems mounted on double-swing doors during the closing operation of the doors.

Heretofore, the present invention has been described with reference to a single swing door, but the present invention can be applied to a double swing door system which includes two swing doors 1*a* and 1*b* to close and open a doorway 3*a*, as shown in FIG. 9.

In such double swing door system, even if a command is applied to close both swing doors 1*a* and 1*b* simultaneously, they may not rotate synchronously with each other due to influence of, for example, wind on the doors. In such a case, the sub-area at the distal edge of one door could detect the other door to cause the one door to stop or reverse its rotation. In order to avoid such from occurring, the sub-areas aa5 of the sensors 200 of the two doors are disabled when the doors come to a position where they form an angle of, for example, 2 degrees with respect to the line connecting the door jambs. During the door opening operation, the distal edges of the doors 1*a* and 1*b* move away from each other, and, therefore, there is no possibility of such erroneous sensing.

The disabling of the sub-areas aa5 is done when double-swing setting described later is used. In addition to the sub-areas aa5, other sub-areas, such as aa6 and aa7, may be disabled in the case of FIG. 9. Further, the sub-areas at the distal edges of the doors have been described to be disabled when the doors are at an angle of 2 degrees, but they may be disabled immediately when the doors start closing.

The disabling of sub-areas may be carried out by, for example, disabling light-emitters of interest, or by ignoring the reception of light by light-receivers in a control unit as will be described later.

Depth of Sensing Areas in the Direction Perpendicular to Door

The depth D (see FIG. 3(*a*)) of the main sensing areas S1 and A1 in the direction perpendicular to the plane of the swing door 1 is determined such that the door 1 cannot collide with an object between the time the door braking control, e.g. the braking of the door to stop or decelerate, starts upon the sensing of the object in the sensing area S1 or A1, and the time the door actually stops or decelerate. For example, an object may be sensed when it approaches the edge of the main sensing area S1 or A1 remote from the door which is in parallel with the door 1, and, then, the door 1 is braked to stop or decelerate. The door, however, continues to move toward the object until it is completely stopped. The depth D of the sensing area S1 and A1 is such that the door 1 can be completely stopped before it would collide with the object. The depth D should be determined in accordance with the braking force of a brake system associated with a motor which drives the door, the weight of the door, and play associated with a decelerator for the motor. In one example, the sum of the depths of the main and auxiliary sensing areas is 1,400 mm, and the depth D of the main sensing area is one-half, i.e. 700 mm.

Sensing of Objects

When an object-sensing received-light representative value for a respective one of the sub-areas at a respective one of door positions is outside a dead zone, which will be described later, the system judges that there is an object in the sensing areas, and, if the object-sensing received-light representative value is inside the dead zone, it is judged to indicate the absence of an object. By adjusting the width of the dead zone, the sensitivity of a sensor can be controlled. The highest sensitivity can be provided by setting the dead zone to have a width of zero.

Figure 10:
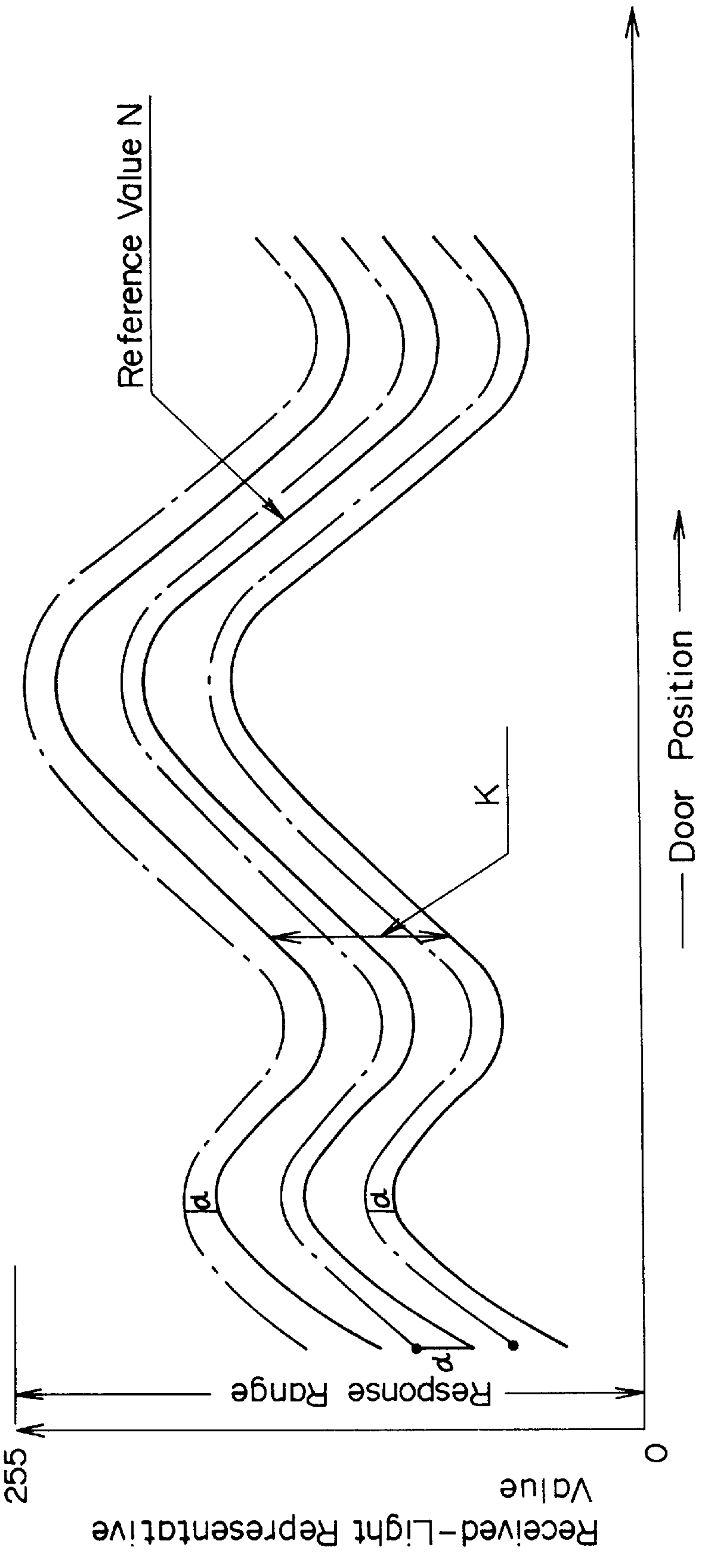
FIG. 10 illustrates a relationship between a reference value and a threshold value of a sensor of the sensor system.

For example, as shown in FIG. 10, the dead zone is determined by determining a limit value, e.g. an upper limit value by adding a predetermined value K/2 to a reference value N determined for each of the door positions, and a limit value, e.g. a lower limit value by subtracting the value K/2 from the reference value N.

Preparation of Reference Value N

Let it be assumed, for example, that no moving object, e.g. a human, is present in and near the moving path of the door 1. The reference value N is determined from the received-light representative value from the light-receiver measured for each of the sub-areas while the door 1 is moving from, e.g. the fully opened position to the closed position. Because the reference value N is prepared from the received-light representative value developed in the absence of an object, the guardrails 7 and 7', for example, are never sensed as an object which has entered into the sensing zones.

Figure 11:
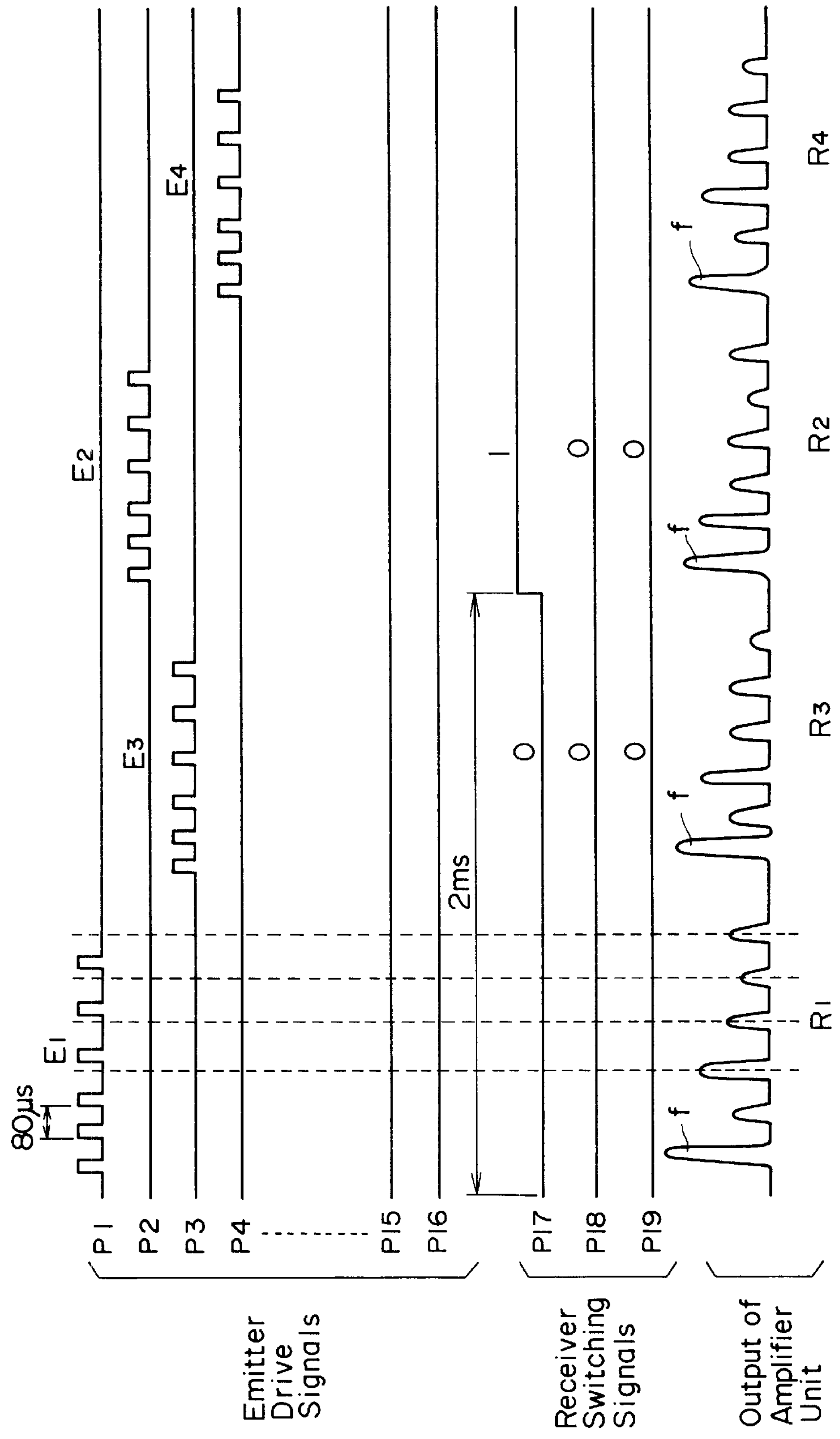
FIG. 11 illustrates light-emitter drive signals, receiver switching signals, and amplifier unit output in the sensor.

In one embodiment, one light-emitter emits successively a predetermined number of light pulses at each of the door positions, as shown in FIG. 11. In the embodiment shown in FIG. 11, a light pulse is emitted five times. In response to the five successive light pulses, five successive light-receiver outputs are developed from the light-receiver corresponding to the light-emitter. The light-receiver outputs are representative of the amounts of light in the successive light pulses as received at the light-receiver. (In this specification, the term “light-receiver output” sometimes refers also to its amplified and bandpass processed version developed at an amplifier unit disposed in a stage succeeding the light-receivers.) The five light-receiver outputs are averaged to provide a received-light representative value for a sub-area at each of the door positions. This received-light representative value is used as the reference value N for that sub-area at that door position. The averaging of the five values provides a reference value free of influence by variations in characteristics of the light-emitters, the light receiver, the circuits associated with the emitters and receivers, and variations in measurement.

In averaging the values, it is preferable to discard the largest and smallest outputs and, then, average the remaining light-receiver outputs, so that influence of external light, e.g. solar light, and noise introduced into the circuits can be eliminated. Instead of discarding the largest and smallest light-receiver outputs, only either one of them can be discarded.

In practice, rather than five successive light pulses, six pulses are successively emitted from each of the light-emitters, and the light-receiver output corresponding to the first emitted light pulse (see pulses “f” in FIG. 11) is ignored. As will be described later, when light pulses are emitted or received, the light-receivers are switched. Influence of transition caused by such switching is introduced into a light pulse first received by each light-receiver. Accordingly, more precise reference values can be prepared from the second and successive light pulses after discarding the first pulse.

When the presence of an object is to be determined, the same processing is employed for preparing the received-light representative value by processing light-receiver outputs.

Correction of Reference Value

Once the reference values are determined, the environment, e.g. the weather may change. In such a case, if the reference values are fixed, the sensor may indicate the presence of an object which actually is not present or may indicate as if no object were present even in the presence of an object. For avoiding such erroneous sensing, correction of the reference value is made when the reference values are within the dead zone, i.e. when no object is within the sensing zone.

For example, the respective reference values for the respective door positions may be corrected when the door 1 is moving from the fully opened position to the closed position, i.e. when the door 1 is in the closing stroke. This is preferable because during the closing stroke, it is highly likely that no object is present within the sensing zone, so that only changes in environment can be detected and, therefore, the respective reference values can be corrected to more suitable ones.

Alternatively, the reference value for the closed position only may be corrected when the door 1 is in the closed position. Let it be assumed, for example, that the approach side of the door faces the outdoors when the door 1 is in the closed position. In such a case, it is only when the door is in the closed position that the reference value changes largely due to weather changes, and, therefore, only the reference value for the closed position need be corrected. However, the reference values at the inner door positions need not be corrected.

Where it can be considered that changes similar to changes in the environment of the door 1 in the closed position also occur at the remaining door positions, the reference values at the remaining door positions may be corrected, taking the received-light representative value at the closed position into account. Usually, a swing door remains in the closed position for a relatively long time, the most effective correction for changes in environment can be available at the closed position. The correction of the reference values is carried out according to the later-mentioned reference value correcting processing.

After the reference values are determined, immobile objects, such as a doormat and a flower pot, may be placed in the path of the swing door 1 or in the sensing zone. In this case, an object-sensing received-light representative value developed from the sensor when the door 1 swings, is outside the dead zone. A substantially constant received-light representative value is developed for a predetermined time (a stationary object sensing time) in case that the door is arranged to be controlled to immediately stop moving when the presence of such stationary objects is sensed. In such a case, the width of the dead zone is corrected, with the flower pot and the doormat taken into account.

On the other hand, if the door 1 is controlled to decelerate when an object is sensed, a stationary object may be sensed at the same door position each time the swing door 1 is opened and closed, which causes the door 1 to decelerate. If an object is sensed in the approach-side of the door 1 at any of the door positions, e.g. at the closed position, the door may be caused to reverse its moving direction. If the reversal of moving direction at the same door position is repeated a predetermined number of times, the sensor system determines that the sensed object is stationary. Then, the reference value is corrected, taking the presence of the stationary object into account. The correction is carried out by the reference value correcting processing and the dead zone width correcting processing as will be described later.

The mode in which the above-stated correction of reference values and/or width of the dead zone is done when a flower pot and the like is sensed is referred to as temporary-stop and sense mode, and the mode in which such correction is not done and the flower pot is continuously sensed is referred to complete-stop and sense mode. The user can determine which mode should be employed, as described later.

Adjustment of Amount of Light Emitted

The swing door system may be installed in a variety of environments. For example, the door system may be installed on a darkish floor, or it may be installed on a white floor. If the light-emitters are arranged to emit the same amount of light in any environments, reference values and object-sensing received-light representative values in either case may be outside the response range of the sensors.

The output of the light-receiver is analog-to-digital (A/D) converted in an A/D converter before it is applied to a controller. Due to a reference value set in the A/D converter, it converts the light-receiver output signals above a predetermined value to a fixed value. For example, the A/D converter may convert the light-receiver output equal to or less than 3 V to a digital signal corresponding to a value, for example, 255, which is proportional to the magnitude of the light-receiver output. If the light-receiver output is above 3 V, however, it is converted always to the digital value corresponding to the value 255. Similarly, light-receiver output signals less than a predetermined value are all converted to a digital signal corresponding to a value 0. The range of from 0 to 255 is referred to as response range. (See FIG. 10.)

If the reference values, the upper and lower limit values, and object-sensing received-light representative values remain outside the response range for a long time, the sensor cannot provide precise detection of an object. In order to avoid it, according to the present invention, the amount of light to be emitted from the light-emitter is adjusted such that reference values and object-sensing received-light representative values are within the response range. The adjustment is such that the reference values can be substantially intermediate between the upper and lower limits of the response range.

This adjustment is achieved in the later-mentioned Program for Adjusting Amount of Light To Be Emitted.

Use of Plural Swing Doors

Figures 12A, 12B, 12C, 12D:
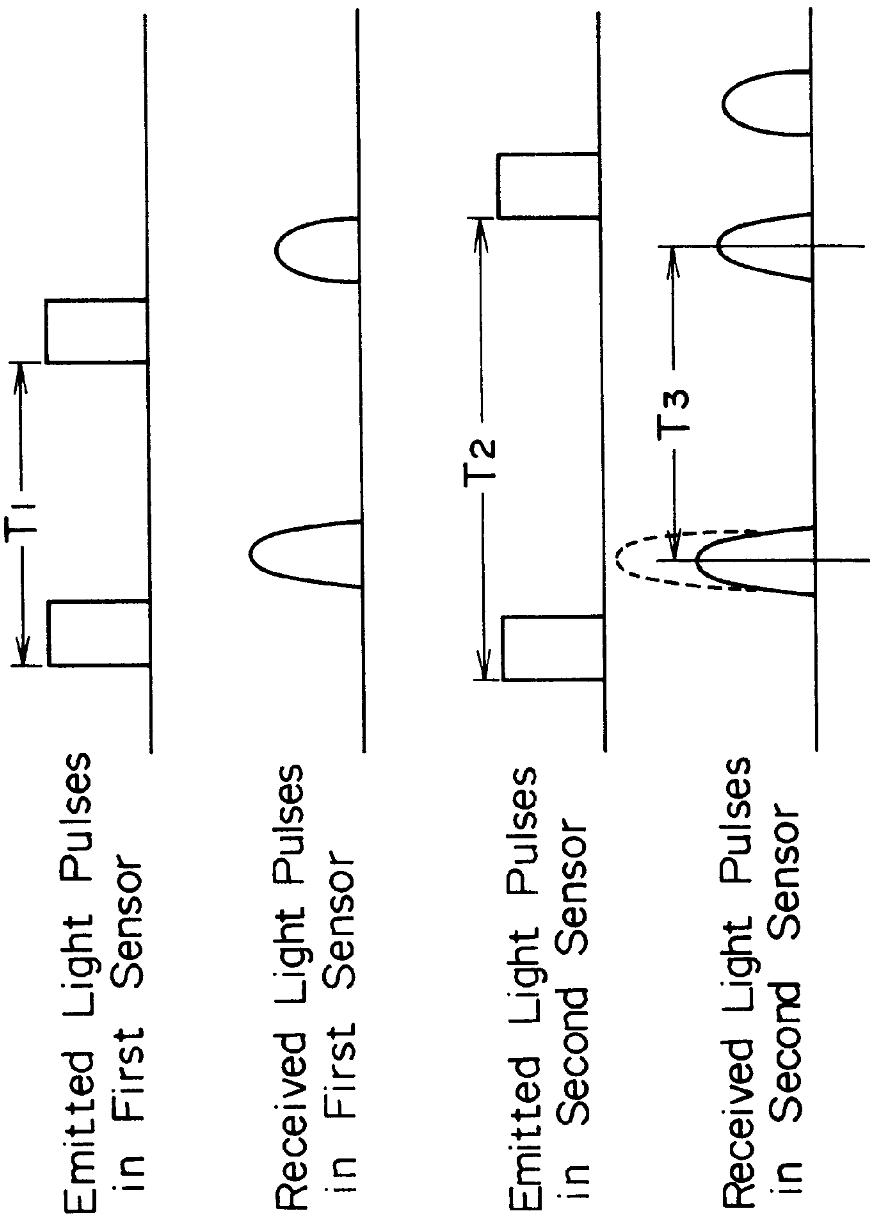
FIG. 12(*a*)–12(*d*) illustrate light emitting periods of a plurality of operating sensor systems mounted on adjacent swing doors.

It does not always happen that only one swing door is installed. For example, when a double swing door system, described previously, is used, two swing-side sensors are disposed adjacent to each other, and two approach-side sensors are disposed adjacent to each other. In such a case, it is possible that light emitted from a light-emitter of one sensor may be reflected from an object or a floor and received by a light-receiver of another sensor, so that the operation of the latter light-receiver can be interfered with light from the former light-emitter. In order to avoid this, the period T1 of light emission of first one of two adjacent sensors is made different from the period T2 of light emission of a second sensor, as shown in FIGS. 12(*a*)–12(*d*). In this case, if the two light-emitters start emitting light completely simultaneously, the first light pulses may interfere with each other. However, as previously described, the light-emitters of the present invention are arranged to emit six light pulses, while the associated light-receivers are arranged to ignore received light pulses corresponding to the first light pulses. Accordingly, interference will never occurs. A user of the door system selects one of four light-emitting periods A, B, C, and D within a range of from 3.5 KHz to 4 KHz for light-emitters of each of the sensors 100 and 200.

In addition to employing different light-emitting periods, both of largest and smallest ones of reference value determining received-light representative values or object-sensing received-light representative values are discarded, as described previously.

However, even if different light emitting periods are employed for the first and second sensors, the light-receiver of the second sensor may simultaneously receive not only light emitted from the light-emitter of the second sensor but also light emitted from the light-emitter of the first sensor, as shown in FIGS. 12(*a*)–12(*d*). In such a case, the received light in the second sensor will be largest as indicated by a broken line in FIGS. 12(*a*)–12(*d*).

The light-receiver of the second sensor may receive light emitted from the light-emitter of the first sensor and reflected from the floor or an object at a timing earlier than its nominal light-receiving timing. In such a case, the period T3 of the received-light pulses of the second sensor is shorter than its nominal period T2. In other words, the frequency of the received-light signal becomes 1/T3 that is higher than its nominal frequency 1/T2. The received-light signal is applied to an amplifier unit (e.g. 314 in FIG. 14) which will be described in greater detail later. The amplifier unit is provided with a bandpass filter having a pass band that allows frequencies in a range of from 3.5 KHz to 4 KHz to pass therethrough, so that signals having the above-stated four periods A through D can pass through the filter. The frequencies 1/T1 and 1/T2 are within the described frequency range. Accordingly, received-light signals containing components causing the signal frequencies to be higher than the above-described nominal frequency are attenuated largely to a smallest value.

The above-described method of employing different periods for different sensors may be sometimes insufficient for avoiding interference between sensors because the use of different periods sometimes produces largest and smallest values of the received-light signals. To avoid influence of the largest and smallest values, they are discarded, and the values of the remaining received-light signals are averaged. The average value is used as a reference value or an object-sensing received-light representative value.

If the difference between the largest and smallest values of the received-light signal is larger than a predetermined value, for example, 25, which is equal to a quarter of an aimed value, 100, of light to be received by a light-receiver, it is judged to indicate that there is a significant interference, and averaging of the received-light signals values is interrupted. This interruption is carried out both when reference values are prepared and when object-sensing received-light representative values are prepared. Prevention of interference can be made with higher precision by setting the predetermined difference value smaller. The value of 25 has been experimentally determined.

General Structure of Hardware

Figure 13:
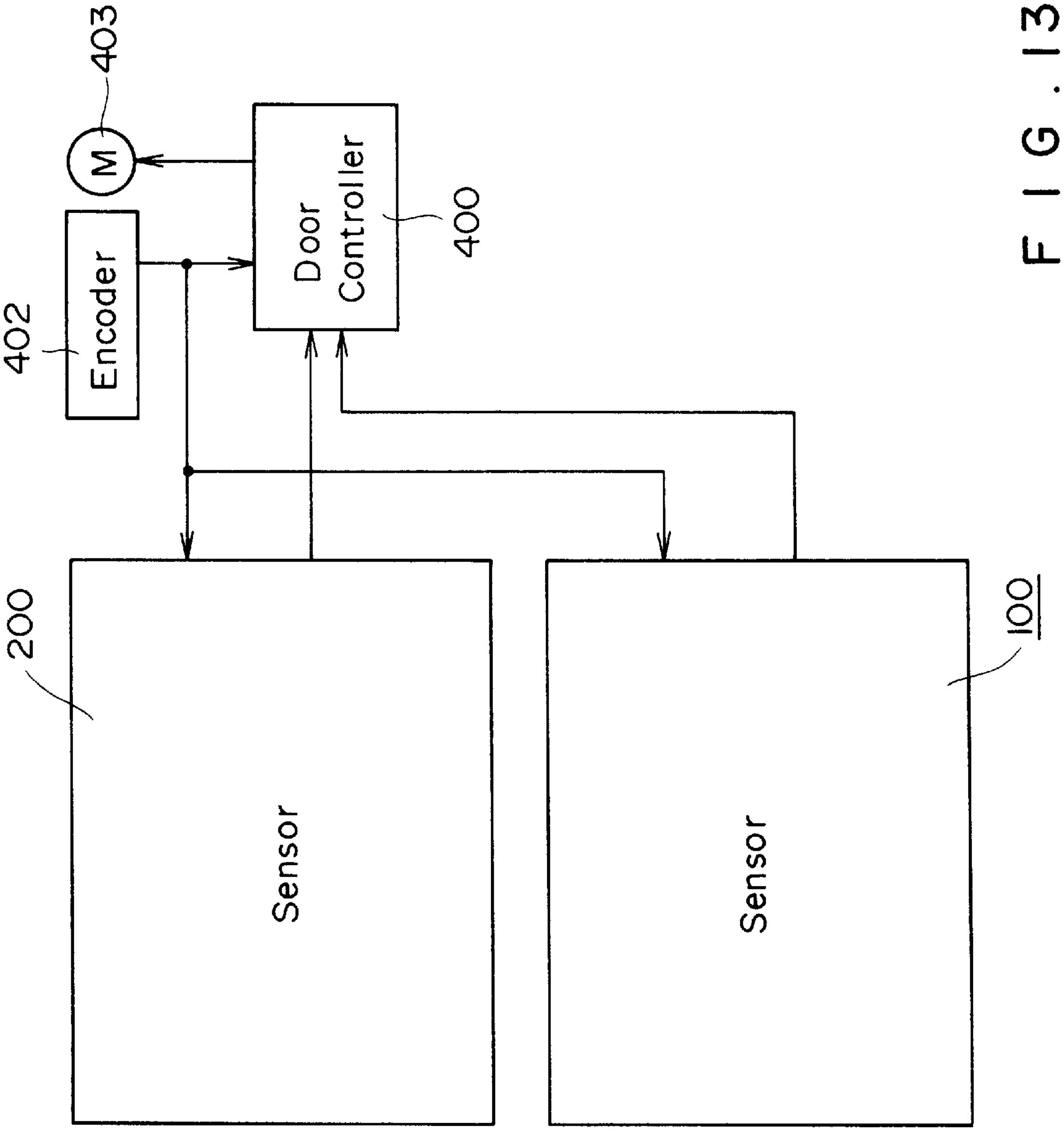
FIG. 13 is a block diagram of an automatic door system with the sensor system mounted thereon.

The swing-side sensor 100 and the approach-side sensor 200, together with a door controller 400, an encoder 402 and a motor 403, form an automatic door system, as shown in FIG. 13. The door controller 400 is responsive to object-sensing received-light representative values from the swing-side sensor 100 and the approach-side sensor 200 to control the motor 403 which drives the swing door. The encoder 402 provides a signal indicating the position of the door and the direction of the swing of the door, to the door controller 400, the swing-side sensor 100 and the approach-side sensor 200.

Structure of Sensors

Figure 14:
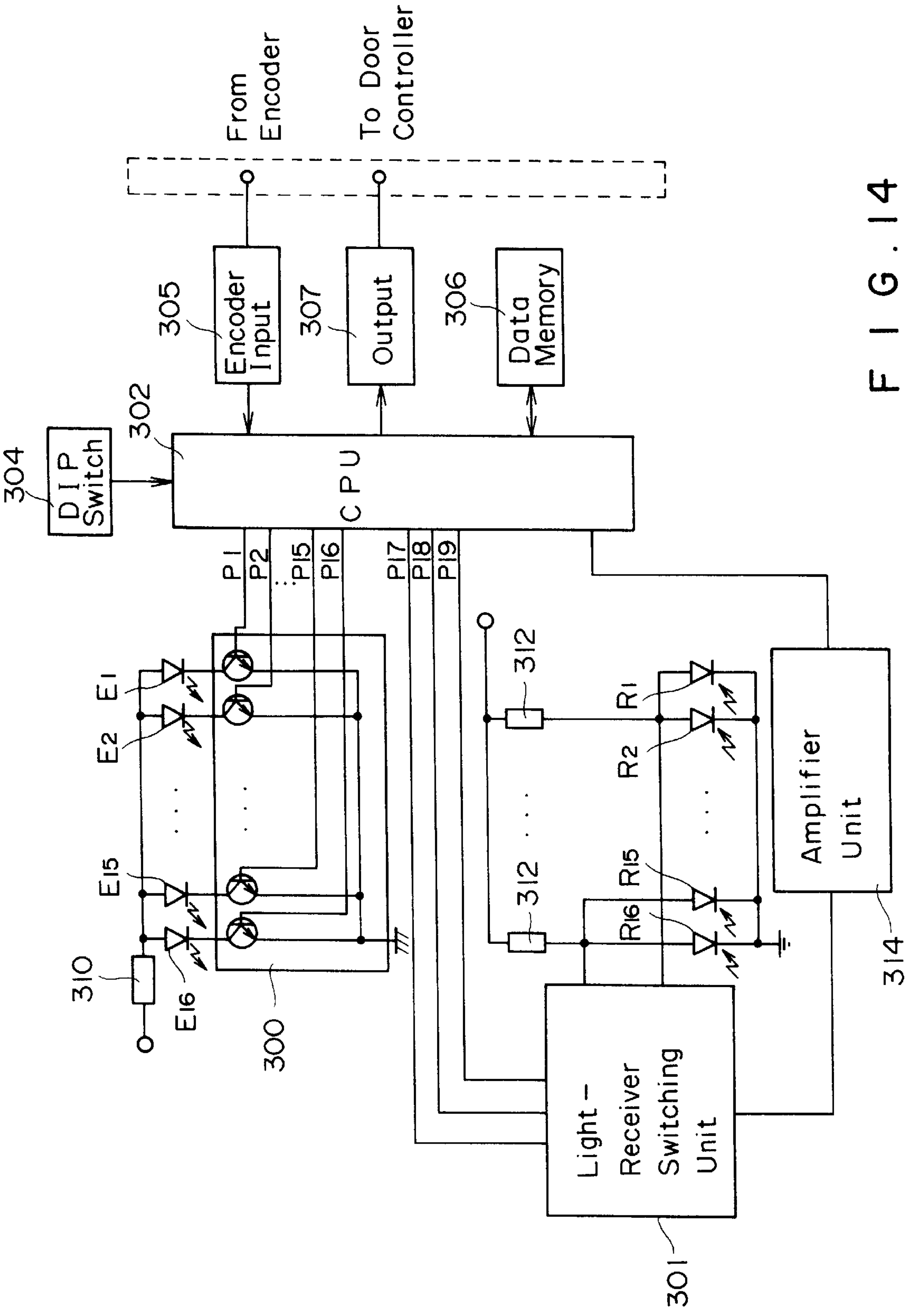
FIG. 14 is a block diagram of one of the sensors of the sensor system.

The approach-side sensor 200 and the swing-side sensor 100 have the same structure, which is shown in FIG. 14.

Each sensor includes, in addition to the light-emitters E1 through E16 and the light-receivers R1 through R16, the controller which includes a CPU 302, a DIP switch unit 304, an encoder input unit 305, an output unit 307, a data memory unit 306, a driving unit 300, a light-receiver switching unit 301 and the amplifier unit 314. The DIP switch unit 304 is connected to the CPU 302. As shown in FIGS. 15A and 15B, the DIP switch unit 304 includes two DIP switches SW1 and SW2, and the DIP switch SW1 includes six ON-OFF switches 1 through 6. The DIP switch SW2 includes six ON-OFF switches 7 through 12.

The CPU 302 receives from the encoder 402 through the encoder input unit 305, a signal which indicates the angle of the swing door with respect to its closed position (0°) and indicates whether the door is moving toward the fully opened position or the closed position. The signal from the encoder 402 may be used, for example, for sensing area control which will be described later in detail.

Setting of DIP Switches SW1 and SW2

The ON-OFF switch 1 of the DIP switch SW1 is used to set a particular sensor for use as an approach-side sensor or a swing-side sensor. When the switch 1 is in the ON side, the CPU 302 treats the sensor as the approach-side sensor, and when the switch 1 is in the OFF side, the CPU 302 treats the sensor as the swing-side sensor.

The ON-OFF switch 2 of the DIP switch SW1 is used to set the particular sensor for use on a single swing door or one of double swing doors. When the switch 2 is ON, the CPU 302 judges that the sensor is used on a single swing door. When the switch 2 is OFF, the CPU 302 judges that the sensor is mounted on one of double swing doors. In the latter case, if the sensor is the approach-side sensor, the CPU 302 causes the sensing areas on the distal edge side of the door to be disabled.

The switches 3 and 4 of the DIP switch SW1 are irrelevant to the present invention, and, therefore, they are described no more.

The switches 5 and 6 of the DIP switch SW1 are used to change the width of the sensing zone of the sensor in accordance with the width of the door, which has been described previously with reference to FIGS. 3(*a*), 3(*b*) and 3(*c*). Although only three different widths of the sensing zone are shown in FIGS. 3(*a*), 3(*b*) and 3(*c*), four different widths A, B, C, and D can be selected according to one embodiment of the invention. With both switches 5 and 6 being ON, the sensing zone width A is selected, with the switches 5 and 6 ON and OFF, respectively, the sensing zone width B is selected, with the switches 5 and 6 OFF and ON, respectively, the width C is selected, and with both switches 5 and 6 OFF, the width D is selected. Depending on the setting of the switches 5 and 6, the CPU 302 determines the light-emitters and the light-receivers to be used for the sensing areas on the distal edge side of the door.

The ON-OFF switch 7 of the DIP switch SW2 is used to select the previously described temporary-stop and sense and complete-stop and sense modes. When the switch 7 is set ON, the CPU judges that the sensor is set in the temporary-stop and sense mode, and when the switch 7 is set OFF, the CPU 302 judges that the sensor is set in the complete-stop and sense mode.

The ON-OFF switches 8 and 9 of the DIP switch SW2 are used to set the stationary object sensing time of the temporary-stop and sense mode. When both switches 8 and 9 are ON, the stationary object sensing time is set to 15 seconds, when the switch 8 is ON with the switch 9 being OFF, it is set to 30 seconds, when the switch 8 is OFF with the switch 9 being ON, it is set to 90 seconds, and when both switches 8 and 9 are OFF, the stationary object sensing time is set to 300 seconds.

The ON-OFF switch 10 of the DIP switch SW2 is used to select the previously described area disabling mode and the area enabling mode. When the switch 10 is ON, the CPU 302 judges that the area disabling mode is selected, and when the switch 10 is OFF, the CPU 302 judges that the area enabling mode is selected.

The ON-OFF switches 11 and 12 of the DIP switch SW2 are used to select the light-emitting periods A, B, C, and D for the sensor in order to avoid interference. When both switches 11 and 12 are ON, the period A is selected, when the switches 11 and 12 are ON and OFF, respectively, the period B is selected, when the switches 11 and 12 are OFF and ON, respectively, the period C is selected, and when both switches 11 and 12 are OFF, the period D is selected.

Light Emission from Light-Emitters

The CPU 302 controls the light emitting operation of the light-emitters selected depending on whether a particular sensor is set to operate as a swing-side sensor or an approach-side sensor. The anode electrodes of the respective light-emitters (e.g. light emitting diodes) E1 through E16 of the sensor receive a positive voltage applied through a load resistor 310, and the cathodes are grounded through the emitter-collector conduction paths of their associated switching transistors in the driving unit 300. The bases of the switching transistors are connected respectively to ports P1 through P16 of the CPU 302. The light-emitters connected to the switching transistors to which driving signals are applied from the CPU 302 through the associated ports, emit light.

At the respective door position (angle), the CPU 302 drives successively or one by one the selected light-emitters to emit light. In principle, first the light-emitter E1 is driven to emit light and, then, disabled, and next the light-emitter E3 is driven to emit light and, then, disabled. Similarly, after the light-emitter E3, the light-emitters E2, E4, E5, E13, E6, E8, E10, E12, E11, E15, E14, and E16 are successively driven and, then, disabled in the named order. However, for example, when the sensor is used as a swing-side sensor and when the door is in the closed position, the actually used light-emitters are only E1 through E5 and E10 through E13 since only the sub-areas sa1 through sa5 and sa10 through sa13 are required to be enabled. Accordingly, even when the other light-emitters' turns come, no driving signals are applied to their associated switching transistors.

If one or more sensing areas are set to be disabled by the area control described later, no driving signals are applied to the switching transistors associated with the light-emitters which would form the sensing areas to be disabled, even if they are the light-emitters E1–E5 and E10–E13.

Accordingly, at any of the door positions, all selected light-emitters are not simultaneously driven to emit light. Since only one light-emitter is driven at one time, power for emitting light can be saved. For light emission from one light-emitter, six signal pulses having a period of, for example, 80 microseconds are applied to its associated switching transistor as the driving signal, as shown in FIG. 11.

Light Reception at Light-Receivers

The CPU 302 causes light-receiver switching unit 301, e.g. a multiplexer, to switch, in accordance with a light-receiver switching signal applied thereto via ports P17–P19 of the CPU 302, light-receiver outputs representing light emitted by respective ones of the selected light-emitters, reflected from the sensing zone, and received by the light-receivers forming pairs with the respective ones of the light-emitters. Specifically, the anodes of the light-receivers or infrared light-receiving diodes R1–R16 receive a positive voltage through respective load resistors 312, with their cathodes grounded. Current flowing through each of the light-receivers changes in accordance with the amount of light received by that light-receiver. The currents, i.e. light-receiver outputs, from the respective light-receivers are applied to the light-receiver switching unit 301 which selectively couples the currents to the amplifier unit 314.

The light-receiver switching signal is switched in the order shown, for example, in FIG. 16 at intervals of, for example, 2 milliseconds as shown in FIG. 11. As is shown in FIG. 16 and understood from the output waveform of the amplifier unit 314 shown in FIG. 11, the light-receiver switching unit 301 simultaneously couples to the amplifier unit 314 the light-receiver outputs from two light-receivers which are not adjacent but near to each other, for example, the light-receiver outputs from the light-receivers R1 and R3. The light-receiver switching unit 301 may be switched in accordance with the light-receiver switching signal so as to cause the light-receiver output of only one light-receiver to be applied to the amplifier unit 314. However, such light-receiver output may contain noise associated with transient produced when the light-receiver switching unit 301 operates. The CPU 302 must be supplied with a light-receiver output after noise therein has disappeared, and, therefore, the measurement of amounts of light is time-consuming. In order to avoid it, while only one light-emitter is driven at a time, two light-receivers are simultaneously driven so as to reduce the effect of the transient on the light-receivers, as described above. However, if the two light-receivers are adjacent to each other, the receiver which does not pair with the currently emitting light-emitter may receive light emitted by that light-emitter. Therefore, two light-receivers which are not adjacent to each other are driven simultaneously to develop light-receiver outputs to be applied to the amplifier unit 314.

As will be understood from FIG. 11, a light-emitter starts emitting light only after its pairing light-receiver is made ready to supply its receiver output to the amplifier unit 314 in response to the light-receiver switching signal.

Further, as shown in FIG. 16, the light-receiver R15 is selected together with the light-receiver R11. However, if the sensor is used as a swing-side sensor, the light-receiver R15 is not used, and, therefore, no driving signal is applied to the pairing light-emitter E15. Thus, the light-receiver R15 produces no light-receiver output. When the sensor is used as a swing-side sensor, the light-receivers R6 and R8, R7 and R9, and R14 and R16 are not used, and, therefore, the CPU 302 does not provide light-receiver switching signals for coupling light-receiver outputs of these light-receivers to the amplifier unit 314. Similar processing should be done for an approach-side sensor, too.

The light-receiver outputs applied to the amplifier unit 314 are amplified and pass through the bandpass filter in the amplifier unit, so that signals having frequencies outside the pass-band are attenuated. The output of the amplifier unit 314 is applied to the CPU 302. The CPU 302 includes an A/D converter which digitizes the amplified light-receiver output from the amplifier unit 314. Five digital signals for one light-receiver are averaged and subjected to other processing described previously, to thereby provide a received-light representative value for a corresponding sensing sub-area at a particular door position. Since the A/D converter in the CPU 302 has upper and lower limits of a light-receiver output which it can convert into a digital signal, as described previously, the amount of light to be emitted is adjusted as will be described later.

Storage of Reference Value Data

The received-light representative value computed in the CPU 302 in the manner described above for each sensing sub-area for each door position in the absence of any object in the sensing zone is stored as a reference value in the data memory unit 306. FIG. 17(*a*) shows a reference value for each of the sub-areas sa10, sa11, sa12 and sa13 of the auxiliary sensing area S2 of the swing-side sensor 100 in each of the door positions (angles). The reference value is an average of the light-receiver output values from each of the light-receivers R10, R11, R12 and R13. As shown in FIG. 17(*a*), the data memory unit 306 stores only the reference values for the closed position (i.e. when the door is at an angle of from 0 to 2 degrees) and for the fully opened position (i.e. when the door is at an angle of from 89 to 90 degrees) for the sub-areas of the auxiliary sensing area. This is because the auxiliary sensing area S2 is disabled when the door opens two (2) degrees. Although the reference values for the fully opened position are stored in the data memory unit 306, they are not used because, when the door is in the fully opened position, the auxiliary sensing area S2 continues to be disabled.

FIG. 17(*b*) shows a reference value for each of the sub-areas sa1, sa2, sa3, sa4 and sa5 of the main sensing area S1 of the swing-side sensor 100 for each of the door positions (angles). As shown in FIG. 17(*b*), all of the reference values from the light-receiver R5 for the sub-area sa5 for the respective door positions are stored. As for the sub-areas sa1 through sa4, however, the individual light-receiver output values from the light-receivers R1 through R4 for the closed and fully opened positions are separately stored as reference values, but, for the remaining door positions, the average of the light-receiver output values from the light-receivers R1 and R3 which are simultaneously applied to the amplifier unit 314 is stored as the reference value common to the sub-areas sa1 and sa3. Similarly, the average of the light-receiver output values from the light-receivers R2 and R4 which are simultaneously applied to the amplifier unit 314 is stored as the reference value common to the sub-areas sa2 and sa4.

With this storage arrangement, the memory capacity of the data memory unit 306 can be saved. If four reference values for the respective sub-areas sa1 through sa4 are individually stored for each of door positions in a memory of a fixed memory capacity, the door position or angle for which each reference value is used must be larger. For example, in the example shown in FIG. 17(*b*), the reference values are prepared and stored for angles at angular intervals of one (1) degree, but if the reference values for all of the sub-areas sa1 through sa4 are to be individually stored, the angular intervals must be, for example, twice, i.e. two (2) degrees. Accordingly, the same reference value must be used for a wider angular range, which degrades the sensing precision of the sensor.

In the column "Pulse Count" in FIGS. 17(*a*) and 17(*b*), the numbers of encoder pulses corresponding to the respective door positions are exemplified.

Although not shown, reference values for the respective sub-areas are prepared and stored in the data memory unit 306 for the approach-side sensor, too.

The CPU 302 uses the references values, the limit values, and object-sensing received-light representative values which are prepared in the manners stated above, to determine the presence of an object in the sensing zone. The CPU 302 informs the door controller 400 of the presence of the object via the output unit 307 shown in FIG. 14.

Program for Adjusting Amount of Light To Be Emitted

Now, the processing executed by the CPU 302 is described.

When power is supplied to the door controller 400, it moves the swing door to the closed position and causes power to be supplied to the sensors. In response to the supplying of the power to the sensors, the CPU 302 executes a program for adjusting the amount of light to be emitted shown in FIG. 18. In this program (Light Amount Adjustment), the CPU 302 stands by for a stand-by time (STEP S30). This stand-by time is necessary because any person in the path of the door can go out of the path in this stand-by time before the door is moved to the fully opened position for the preparation of reference values after the adjustment of the amount of light to be emitted is completed.

Next, the amount of light to be emitted from each light-emitter is set to about one-third of the largest amount of light that light emitter can emit (STEP S32). This setting may be done by, for example, adjusting the duty ratio of the light-emitter drive signal. The value of one-third of the largest amount is suitable because, with this amount of light to be emitted, the received-light representative value is often located intermediate between the upper and lower limits of the response range, i.e. the received-light representative value is often an aimed value.

Next, one of light-emitter-light-receiver pairs which have been determined to be used depending on whether a particular sensor is used as a swing-side sensor or an approach-side sensor, is selected (STEP S34). Then, a light-receiver switching signal is applied to the light-receiver switching unit 301, so that light-receiver outputs from the light-receiver of the selected pair can be coupled to the amplifier unit 314 (STEP S36.) Next, a drive signal is applied to the driving unit 300 to drive the light-emitter of the selected pair to emit light (STEP S38).

The light-receiver output from the corresponding light-receiver is applied through the amplifier unit 314 to the CPU 302 where it is A/D converted (STEP S40). Next, determination as to whether the resulting digital signal, i.e. received-light representative value (RRV) is equal to the aimed value (AV) or not (STEP S42). If the answer is NO, the amount of light to be emitted is adjusted in accordance with the difference between the received-light representative value and the aimed value, by, for example, changing the duty ratio of the drive signal applied to the light-emitter (STEP S44). Then, the process returns to STEP S38, and STEPS S38, S40 and S42 are repeated until the received-light representative value (RRV) becomes equal to the aimed value (AV). When the received-light representative value becomes equal to the aimed value, determination is made whether all of the predetermined pairs have been selected (STEP S46). If the answer is NO, the process returns to STEP S34, and the above-described processing is repeated for all of the predetermined pairs.

When all of the predetermined light-emitter-light-receiver pairs have been selected and, hence, the adjustment of the amounts of light to be emitted by the respective light-emitters of the predetermined pairs have been completed, a command to open the door is applied to the door controller 400 from the CPU 302 to thereby bring the door to the fully opened position for preparation of forming respective reference values (STEP S48). Then, the CPU 302 makes determination on the basis of the output of the encoder 402 as to whether the swing door is in the fully opened position or not (STEP S50). If the door has not yet reached the fully opened position, STEPS S48 and S50 are repeated until the door reaches the fully opened position. When the door reaches the fully opened position, memory regions are secured in the data memory unit 306 for storing reference values therein for respective door positions (STEP S52).

Program for Preparing Reference Values

Figure 18:
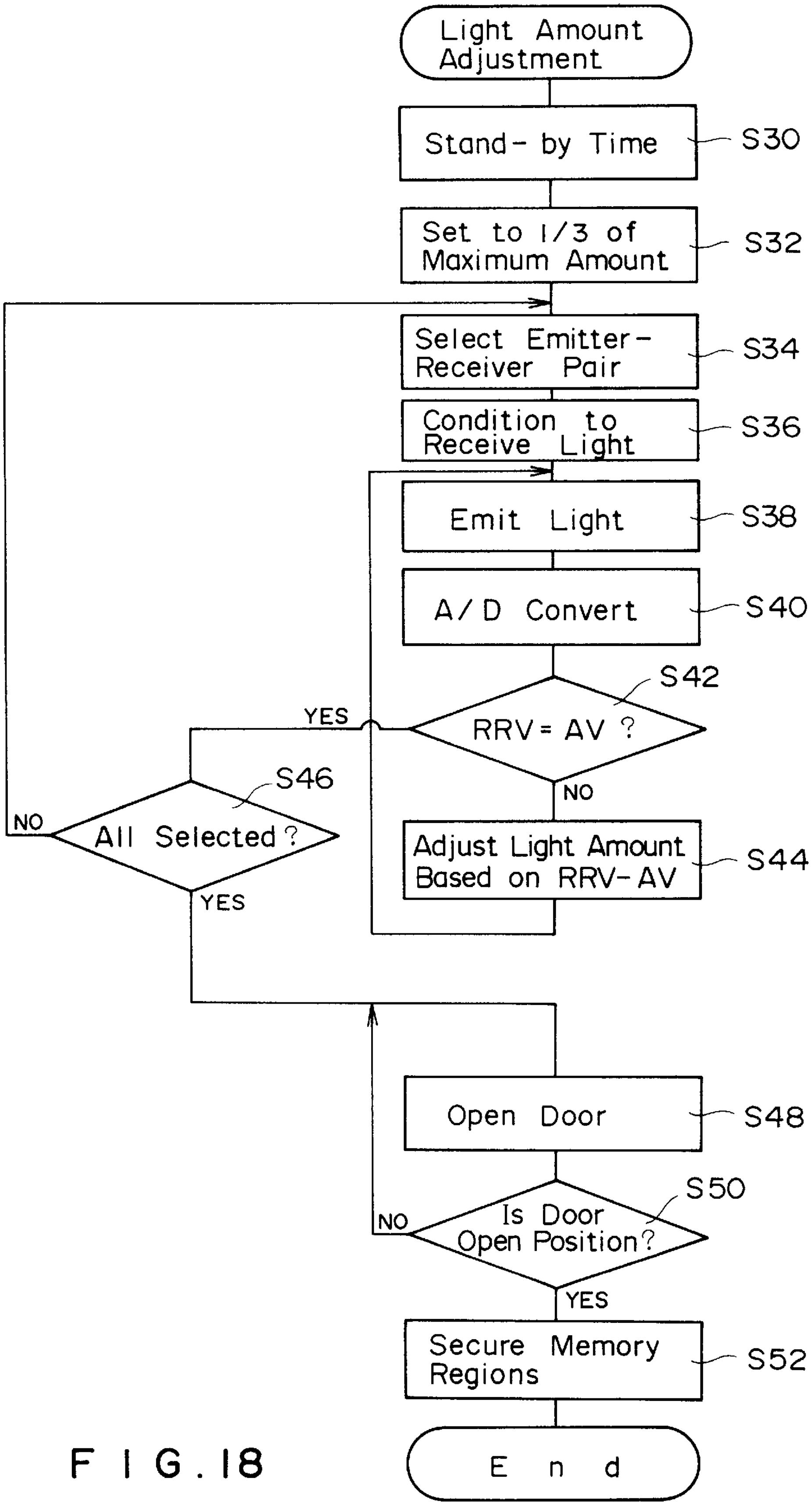
FIG. 18 is a flow chart illustrating how the amount of light emitted is adjusted.
Figure 19:
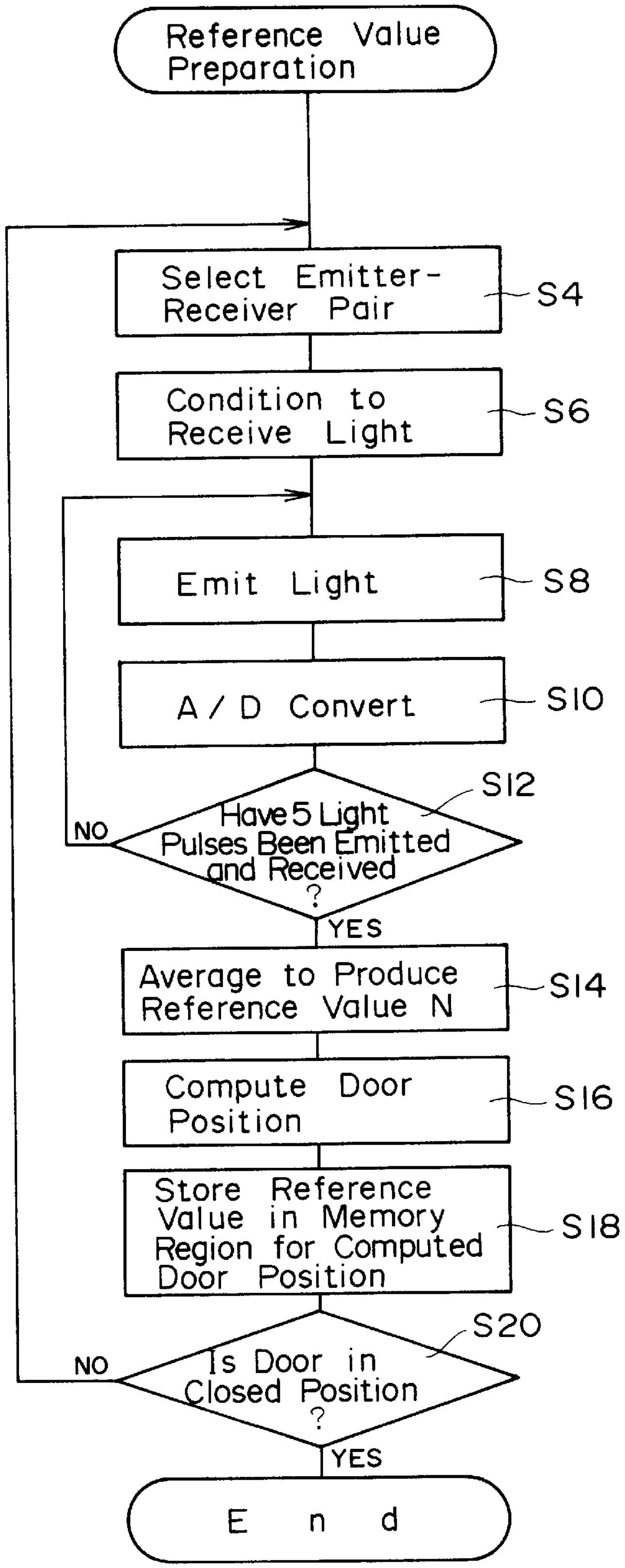
FIG. 19 is a flow chart illustrating how reference values are prepared.

Following the adjustment of the amount of light to be emitted from the light-emitters, the reference value preparation program shown in FIG. 19 is executed. STEPS S4, S6, S8 and S10 similar to STEPS S34, S36, S38 and S40 in the programs for adjusting the amount of light to be emitted by the light-emitters shown in FIG. 18 are executed. Then, one of predetermined pairs of light-emitters and light-receivers is selected. The light-emitter of the selected pair is driven to emit a light pulse and the corresponding light-receiver receives the emitted and reflected light pulse and develops a digitized light-receiver output value. In STEP S12, whether five received-light representative values have been developed is judged. If the answer is NO, STEPS S8, S10 and S12 are repeated until five values are developed. As described previously, the five received-light representative values result from discarding the first one of six received-light representative values which correspond to six light pulses successively emitted and received by the selected pair. When five received-light representative values have been developed, they are averaged to develop an average which is the reference value N (STEP S14).

Thereafter, the door position or angle is computed from the output of the encoder 402 (STEP S16). The reference value N is stored in the region of the data memory unit 306 for the computed door position (STEP S18).

STEPS S14, S16 and S18 are executed for all of the door positions for the swing-side sub-area sa5 and for the closed and fully opened positions for the sub-areas sa1, sa2, sa3, sa4, sa10, sa11, sa12, and sa13, in the case shown in FIG. 17(*b*). Although not all values are shown in FIG. 17(*b*), the program is executed in such a manner that for the sub-areas sa1 through sa4 in the remaining doors positions, the average of the received-light representative values for the sub-areas sa1 and sa3 and the average of the received-light representative values for the sub-areas sa2 and sa4 are stored in the respective memory regions for the respective door positions.

After STEP S18, whether the door has returned to the closed position or not is judged (STEP S20). If the door has not yet been in the closed position, the processing returns to STEP S4, and STEPS S4 through S20 are repeated until the door returns to the closed position. Thus, the reference values for the respective sub-areas in the respective door positions have been stored in the data memory unit 306.

Figure 20:
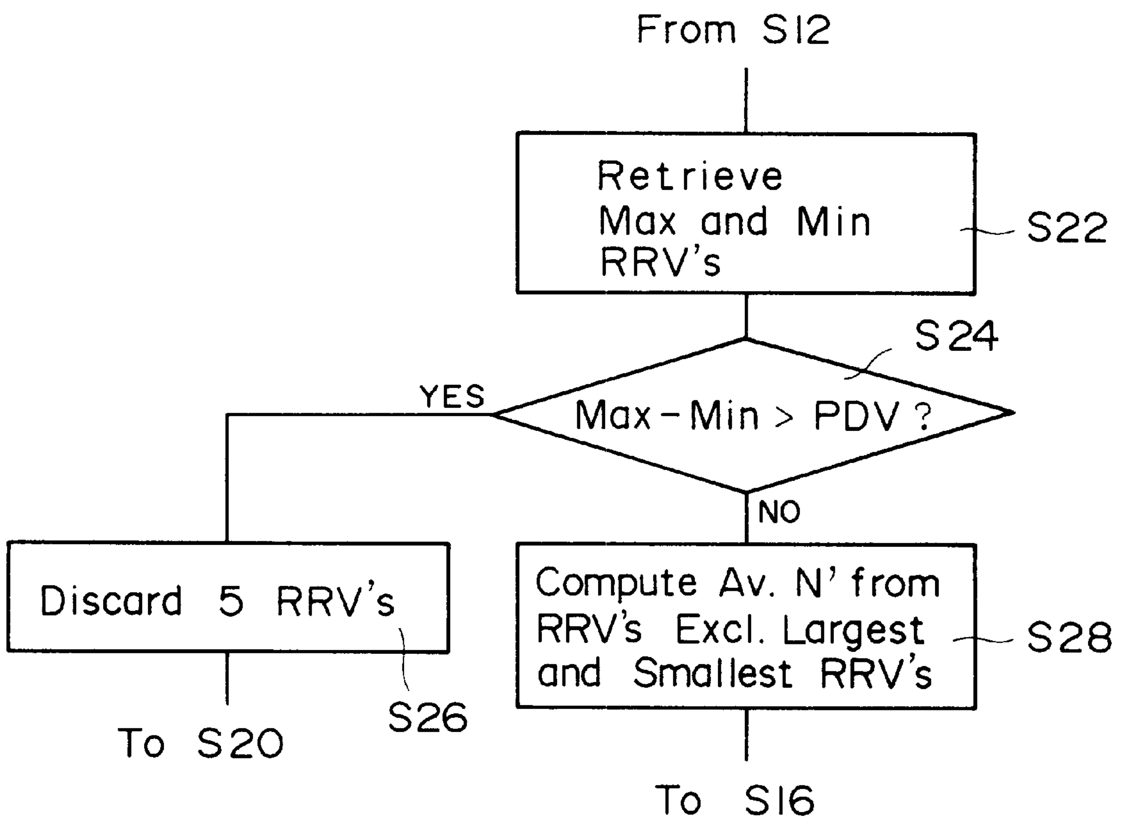
FIG. 20 is part of a flow chart which may be substituted for part of the flow chart shown in FIG. 19.

Instead of STEP S14, processing shown in FIG. 20 may be employed. Largest and smallest ones of the five received-light representative values are retrieved (STEP S22). Whether or not the difference between the largest and smallest received-light representative values is larger than a predetermined difference value (PDV) is determined (STEP S24). The difference larger than the predetermined difference value indicates the possibility of interference of a particular light-receiver with another one, as previously described. Accordingly, all of the five received-light representative values are discarded (STEP S26), and STEP S20 is executed. In other words, a reference value is not prepared for the sensing area where interference may be occurring. On the other hand, if the difference between the largest and smallest received-light representative values is not larger than the predetermined difference value (PVD), the three received-light representative values, except the largest and smallest ones, are averaged to produce a reference value, and the processing advances to STEP S16.

Object Sensing Program

Figure 21A:
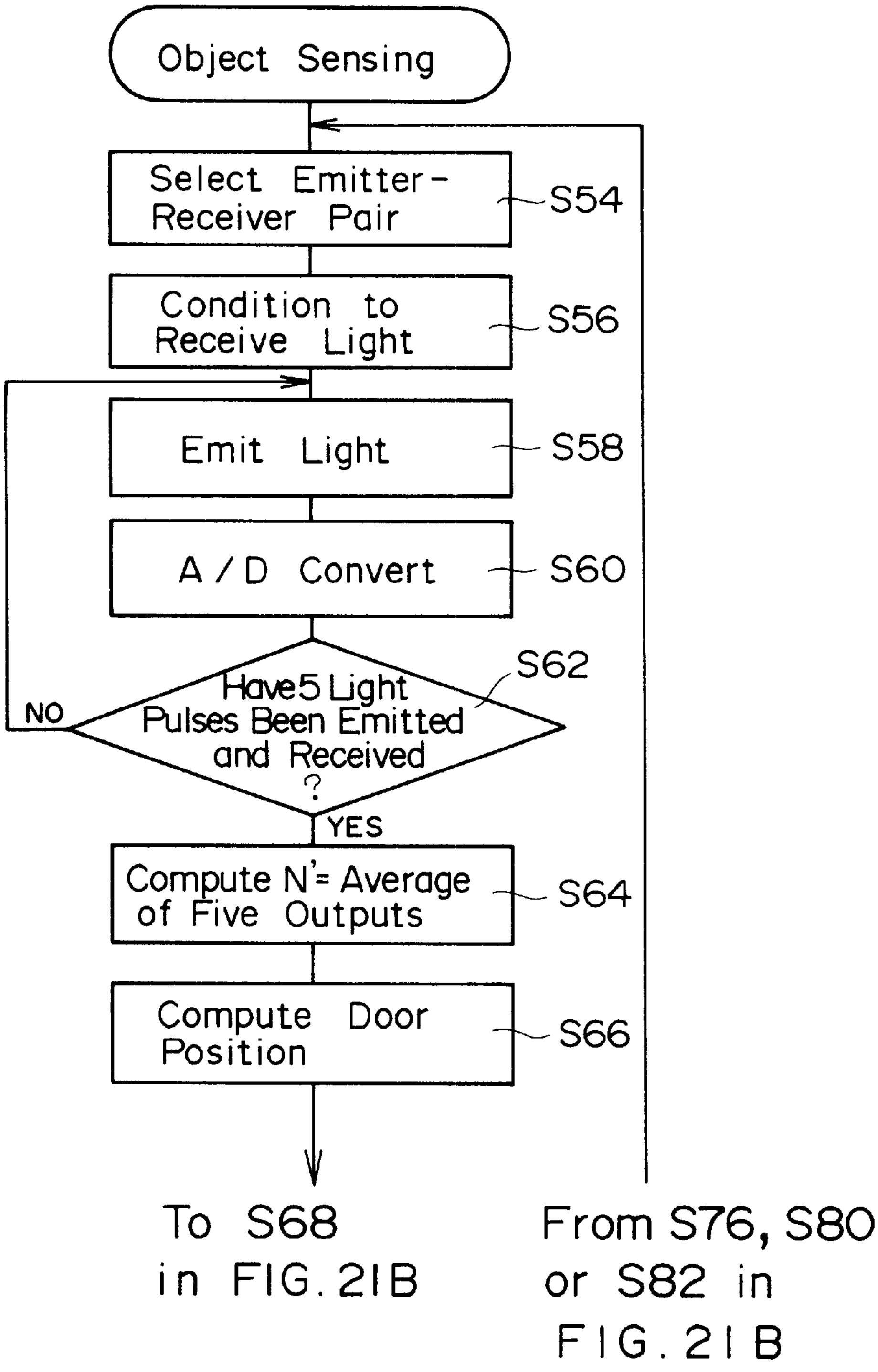
FIG. 21A and 21B show together is a flow chart illustrating how an object is sensed.
Figure 21B:
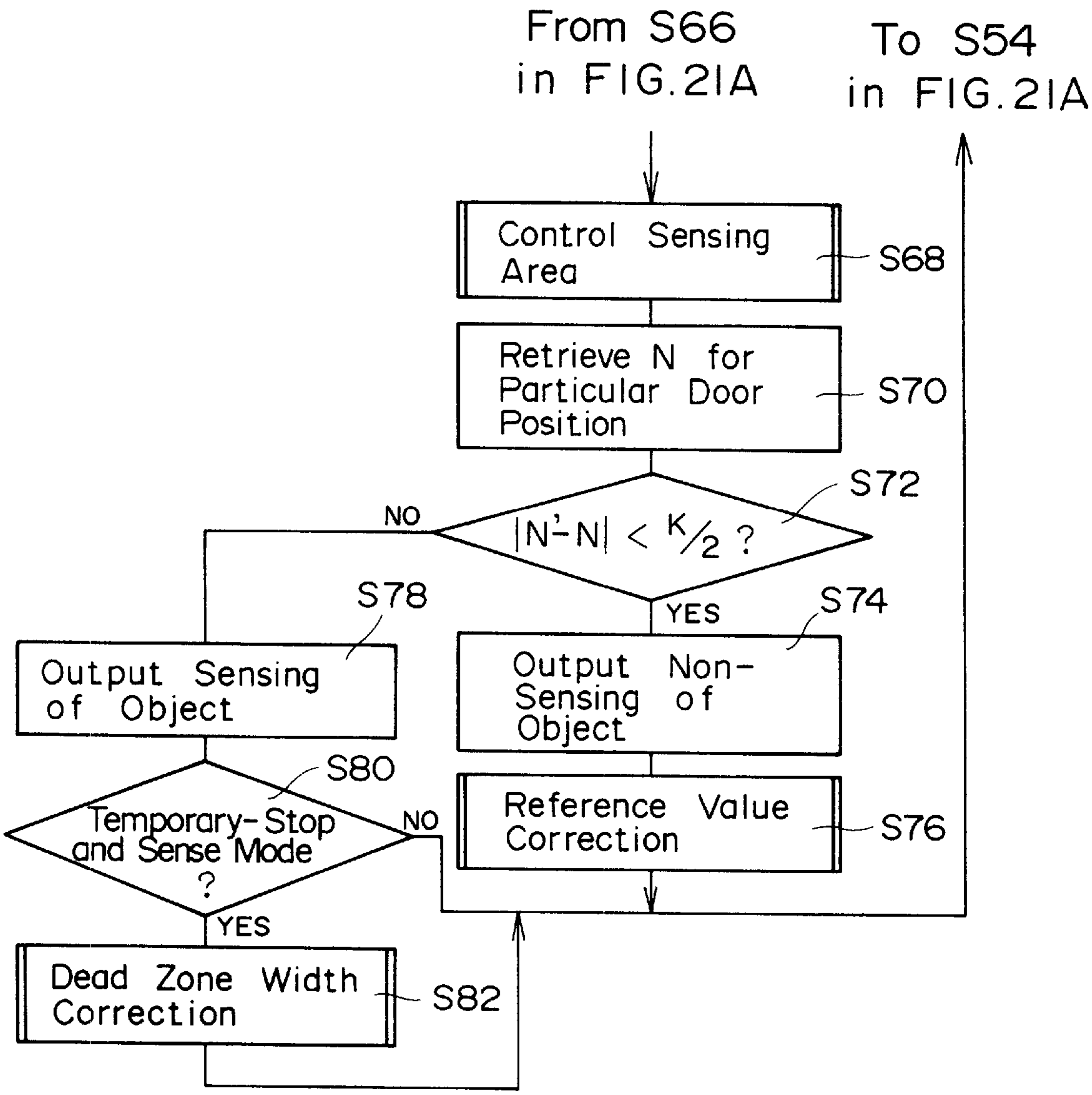

FIGS. 21A and 21B show together an object sensing program. In this program for sensing the presence of an object in the sensing zone, STEPS S54, S56, S58, S60 and S62 similar to STEPS S4, S6, S8, S10 and S12 in the reference value preparation program shown in FIG. 19 are first executed to develop five light-receiver outputs, by discarding the first occurring one of six successive light-receiver outputs. The five light-receiver outputs are averaged (STEP S64) to develop an average value N'. Alternatively, as in the reference value preparation program shown in FIG. 19, instead of STEP S64, steps similar to STEPS S22–S28 shown in FIG. 20 may be executed. Specifically, largest and smallest light-receiver outputs are retrieved, and, if the difference between them is larger than a predetermined difference value, sensing of an object in that particular sub-sensing area is interrupted. If the difference is not larger than the predetermined difference value, three light-receiver outputs, excluding the largest and smallest ones, are averaged to develop an average value N'.

Next, the door position is determined from the output of the encoder 402 (STEP S66). Then, the sensing area control is performed (STEP S68). The area control will be described in detail later. After that, the reference value N for the sub-area corresponding to the light-emitter-light-receiver pair selected in STEP S54 for the door position determined in STEP S66 is derived (STEP S70).

Then, the absolute value of the difference between N' and N is determined and compared with one-half of a predetermined threshold K (STEP S72). This STEP S72 is to determine whether or not the value N' is within the dead zone indicated by solid lines in FIG. 10. The absolute value of the difference smaller than K/2 means that the value N' is within the dead zone, which is judged to indicate that no object is present. Then, an object non-sensing output is applied to the door controller 400 through the output unit 307 (STEP S74). Then, the reference value correction, which will be described later in detail, is carried out (STEP S76), and the processing returns to STEP S54 where another light-emitter-light-receiver pair is selected.

The absolute value larger than K/2 means that the value N' is outside the dead zone, which is judged to indicate that an object has been sensed, and, then, an object sensing output is applied to the door controller 400 through the output unit 307 (STEP S78). In response to it, the door is stopped or decelerated, or, depending on the door position, the direction of the movement of the door is reversed so that collision of the object with the door can be avoided.

After that, whether the system is in the previously described temporary-stop and sense mode or in the complete-stop and sense mode is judged (STEP S80). If the temporary-stop and sense mode has not been selected, the processing returns to STEP S54, and the next light-emitter-light-receiver pair is selected. On the other hand, if the system is set to the temporary-stop and sense mode, the dead zone width correction, which will be described in detail later, is performed, and, after that, the processing returns to STEP S54, and the next emitter-receiver pair is selected.

In the program shown in FIGS. 21A and 21B, the computation of the door position in STEP S66 and the area control in STEP 68 may be performed before STEP S54.

Sensing Area Control Program

Figure 22:
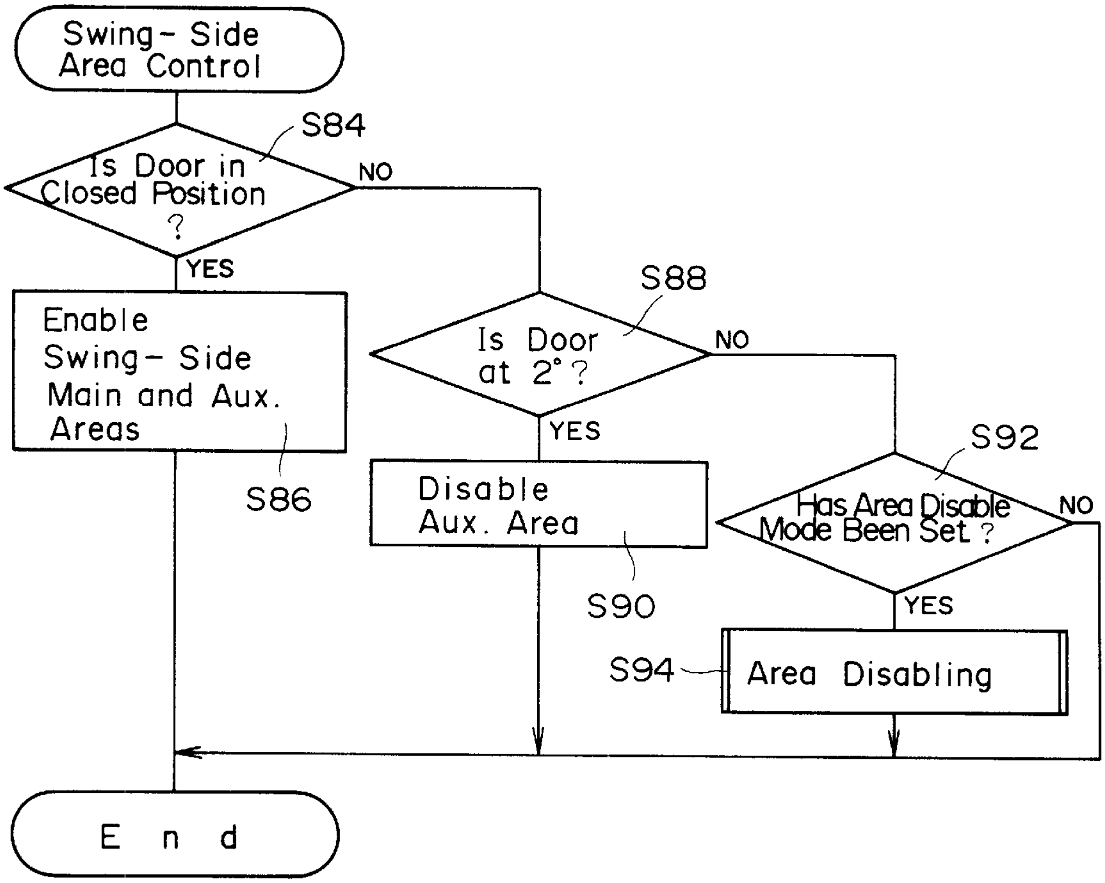
FIG. 22 is a flow chart illustrating how the swing-side sensing areas are controlled.
Figure 24:
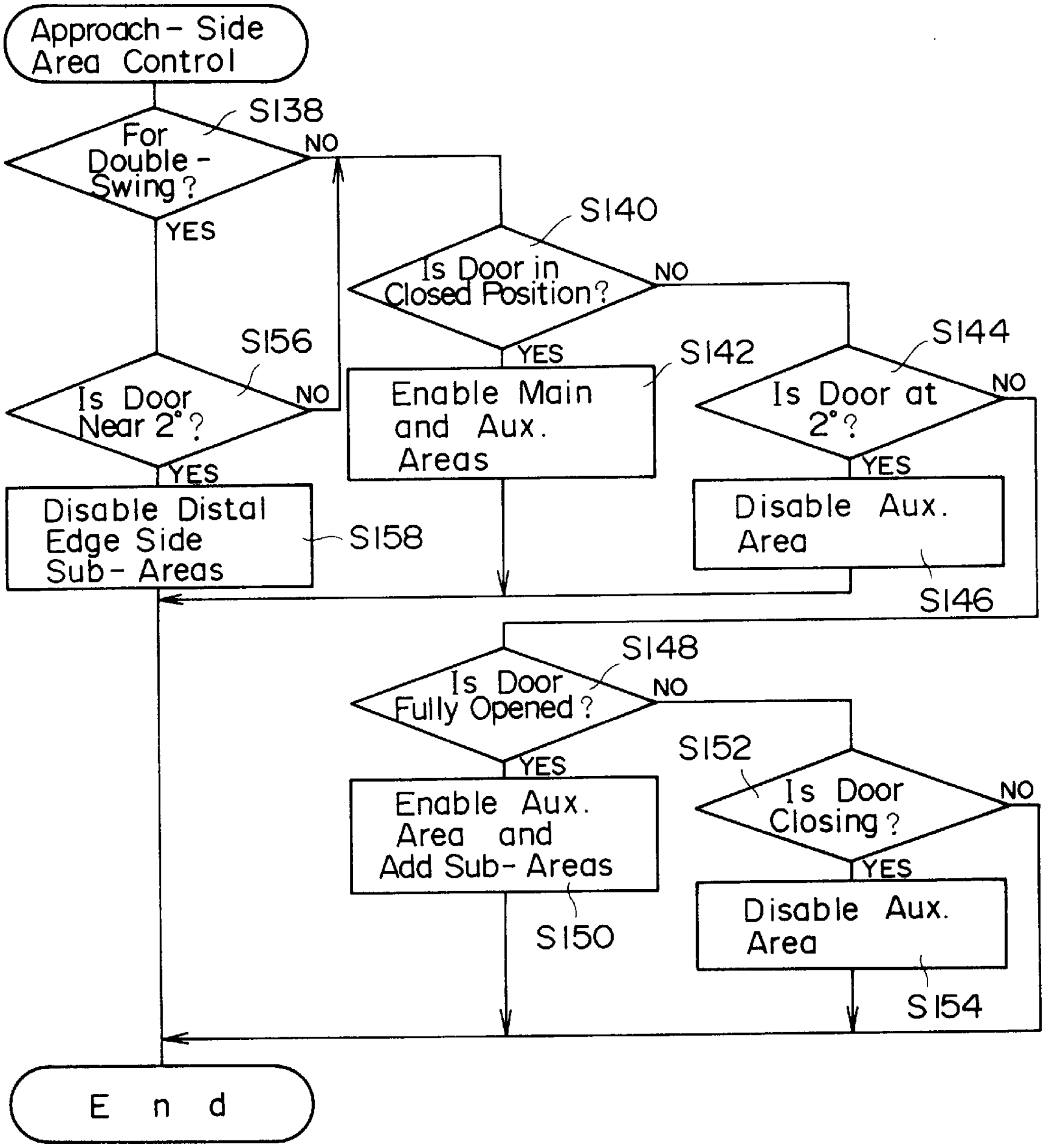
FIG. 24 is a flow chart illustrating how the approach-side sensing areas are controlled.

The sensing area control includes swing-side sensing area control shown in FIG. 22 and approach-side sensing area control shown in FIG. 24.

Swing-Side Sensing Area Control Program

In the swing-side sensing area control, whether the door is in the closed position or not is determined from the output of the encoder 402 (STEP S84). If the door is in the closed position, the swing-side main and auxiliary sensing areas are enabled (STEP S86). In other words, the light-emitters corresponding to the sub-areas constituting the swing-side main and auxiliary sensing areas are sequentially driven by the drive signals applied to them, and the light-receiver output signals from the corresponding light-receivers are applied to the CPU 302 where the average values of the light-receiver outputs are computed.

If it is determined in STEP S84 that the door is not in the closed position, determination is made based on the output of the encoder 402 as to whether the door is open by two (2) degrees (STEP S88). If the door is at two degrees, the auxiliary sensing area is disabled (STEP S90). In other words, even if the times when the light-emitters for the sub-areas constituting the auxiliary sensing area are to emit light come, no drive signals are applied to them. Alternatively, it may be arranged that even if the light-receiver outputs of the corresponding light-receivers are applied to the CPU 302, the average of the light-receiver outputs is not computed in the CPU 302.

If the answer to STEP S88 is NO, whether the area disabling mode has been set or not is judged (STEP S92). If the area disabling mode has been set, the area disabling processing, which will be described in detail later, is performed (STEP S94), and the processing advances to the approach-side sensing area control program. If the area disabling mode has not been set, the processing advances to the approach-side area control immediately.

Area Disabling Program

Figure 23:
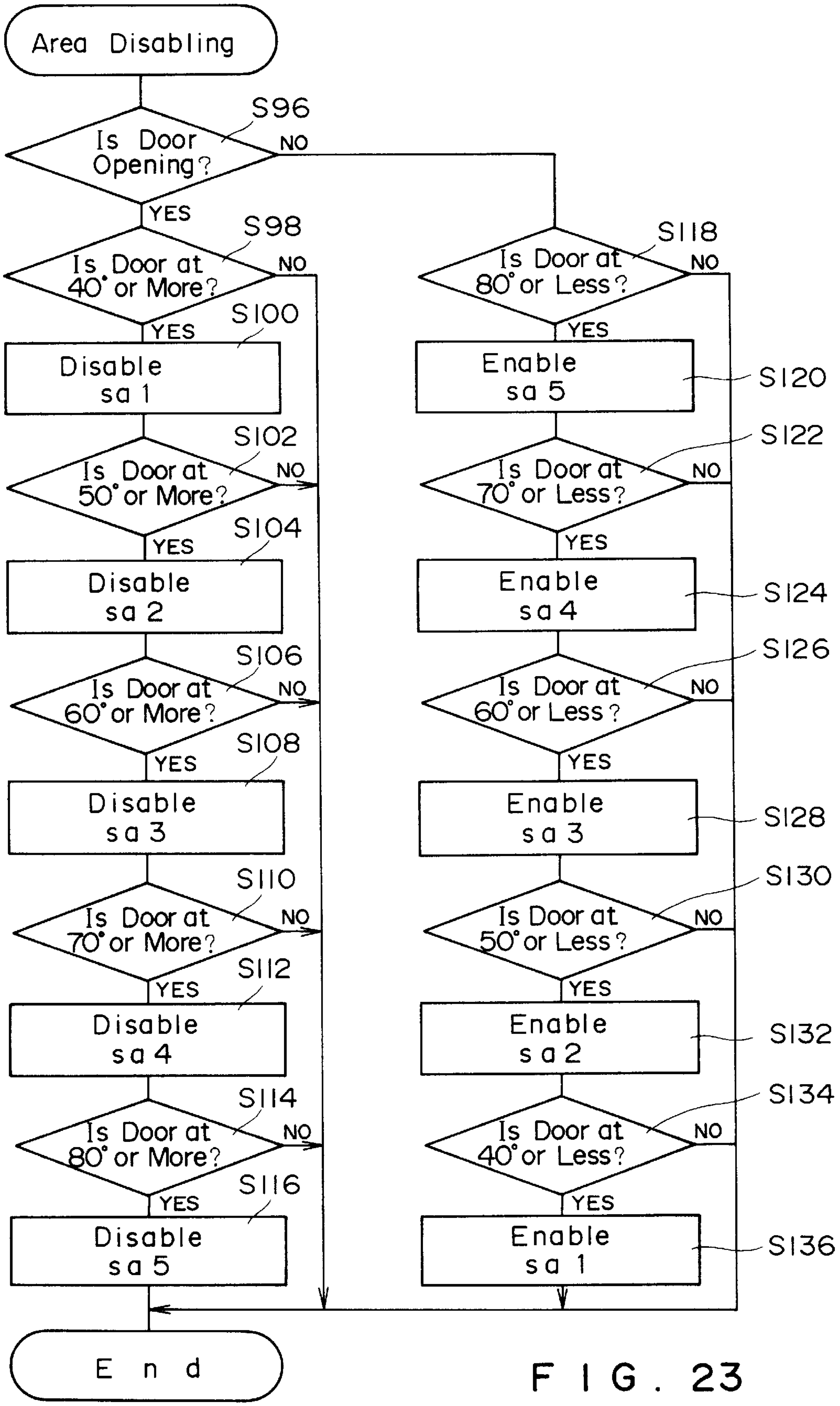
FIG. 23 is a flow chart illustrating how sensing areas are disabled.

As shown in FIG. 23, the area disabling processing starts by judging from the output of the encoder 402 whether the door is opening or closing (STEP S96). If the door is opening, judgment is made as to whether the door has been opened to the angle equal to or more than forty (40) degrees (STEP S98), fifty (50) degrees (STEP S102), sixty (60) degrees (STEP S106), seventy (70) degrees (STEP S110), and eighty (80) degrees (STEP S114), sequentially.

If the door is at an angle of 40 degrees or more, the sub-area sa1 is disabled (STEP S100). If the door is at an angle of 50 degrees or more, the sub-area sa2 is disabled (STEP S104). If the door is at an angle of 60 degrees or more, the sub-area sa3 is disabled (STEP S108). If the door is at an angle of 70 degrees or more, the sub-area sa4 is disabled (STEP S112). If the door is at an angle of 80 degrees or more, the sub-area sa5 is disabled (STEP S116), and, thus, the sub-areas sa1 through sa5 are all disabled. If, in the respective STEPS S98, S102, S106, S110, and S114, the door has not been opened to the respective specified angles, the area disabling processing is ended. In this manner, the sub-areas of the main sensing area are disabled in the order indicated by arrows in FIG. 8. The sub-areas of the main sensing area are disabled in any of the manners similar to the ones described above with respect to the sub-areas of the auxiliary sensing area.

If the answer to the judgment in STEP S96 is NO, judgment is made as to whether the door has been closed to an angle equal to or less than eighty (80) degrees (STEP S118), seventy (70) degrees (STEP S122), sixty (60) degrees (STEP S126), fifty (50) degrees (STEP S130), and forty (40) degrees (STEP S130), sequentially.

If the door has been closed to a door position at an angle of 80 degrees or less, the sub-area sa5 is enabled (STEP S120). If the door has been closed to a door position at an angle of 70 degrees or less, the sub-area sa4 is enabled (STEP S124). If the door has been closed to a door position at an angle of 60 degrees or less, the sub-area sa3 is enabled (STEP S128). If the door has been closed to a door position at an angle of 50 degrees or less, the sub-area sa2 is enabled (STEP S132). If the door has been closed to a door position at an angle of 40 degrees or less, the sub-area sa1 is enabled (STEP S136). In this manner, as the door assumes the door positions successively changing in the direction opposite to the direction indicated by the arrows in FIG. 8, the number of enabled sub-areas adds toward the distal edge of the door.

Enablement of the sub-areas is effected by sequentially applying the drive signals to make the light-emitters constituting the sub-areas emit light and applying the light-receiver outputs of the corresponding light-receivers to the CPU 302 and making the CPU 302 compute the aforementioned average value N'.

In the respective STEPS S118, S122, S126, S130 and S132, if the door has not been reached the respective door positions, the area disabling processing is ended.

Approach-Side Sensing Area Control Program

The approach-side sensing area control starts by judging whether or not the sensor is set for use with double-swing doors (STEP S138), as shown in FIG. 24. If the sensor is not set for use with double-swing doors, whether the door is in the closed position or not is judged (STEP S140). If the door is in the closed position, the approach-side main and auxiliary sensing areas are enabled (STEP S142), and the approach-side sensing area control program is finished. The enablement of the sensing area is done in a manner similar to the one described with respect to STEP S86.

If the door is not in the closed position, whether the door is open at an angle of two (2) degrees is judged (STEP S144). If the door is in the two-degree position, the auxiliary sensing area is disabled (STEP S146), and the approach-side sensing area control program is finished. The auxiliary area may be disabled in a manner similar to the one described with respect to STEP S90.

If the answer to the judgment in STEP S144 is NO, whether the door is in the fully opened position or not is judged (STEP S148). If the door is in the fully opened position, the auxiliary sensing area is enabled and the sub-areas aa4 and aa12 are added to the main and auxiliary sensing areas on the distal edge side of the door as shown in FIG. 7(*b*) (STEP S150). To effectuate it, the light-emitters corresponding to the sub-areas aa4 and aa12 are added to the light-emitters to be selectively driven, and these light-emitters are sequentially driven to emit light. The light-receiver outputs from the light-receivers corresponding to the sub-areas aa4 and aa12 are applied to the CPU 302 together with the outputs from the other selected light-receivers, and the averages N' are computed from these light-receiver outputs. Then the processing is ended.

If the door is not in the fully opened position, whether the door is closing or not is judged (STEP S152). If the door is closing, the auxiliary sensing area including the added sub-areas at the distal edge side of the door is disabled (STEP S154). The disabling of the auxiliary area is performed in a manner similar to the one described with respect to STEP S146. After STEP S154 is achieved or if the door is not closing, the approach-side sensing area control program is ended.

If it is judged that the sensor is set for use with double-swing doors in STEP S138, whether the door has been closed to a position near the closed position, for example, to a position where the door is at an angle of less than two degrees is judged (STEP S156). If the door is near the closed position, the sub-areas on the distal edge side of the door are disabled, and the approach-side area control program is ended. The disabling is performed in a manner similar to the one described with respect to STEP S146.

If the answer to STEP S156 is NO, the processing proceeds to STEP S140.

Reference Value Correction Program

Figure 25A:
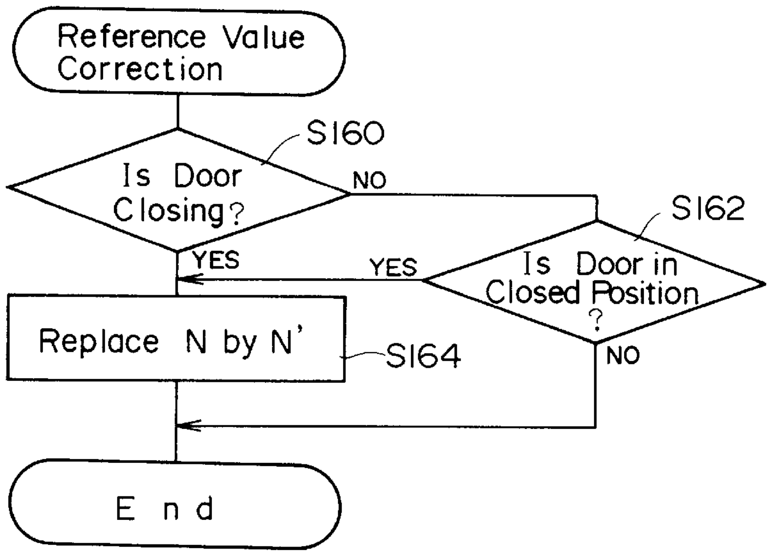
FIGS. 25(*a*), 25(*b*) and 25(*c*) are flow charts illustrating how a reference value can be corrected.
Figure 25B:
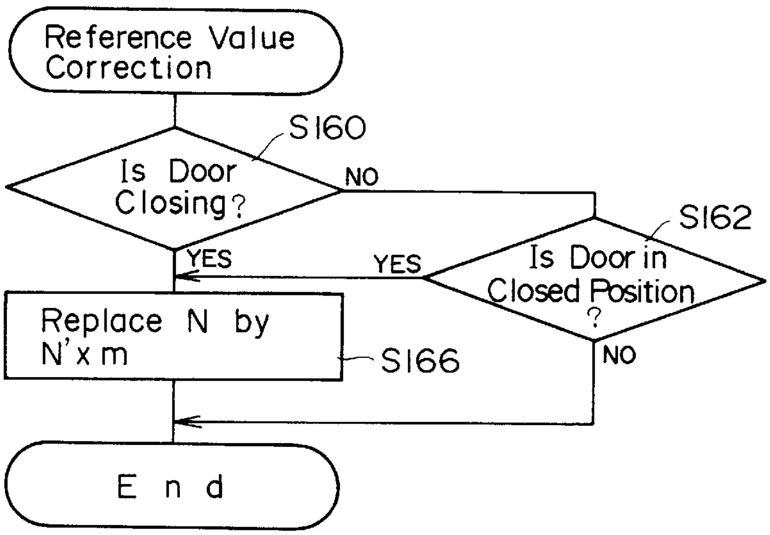
Figure 25C:
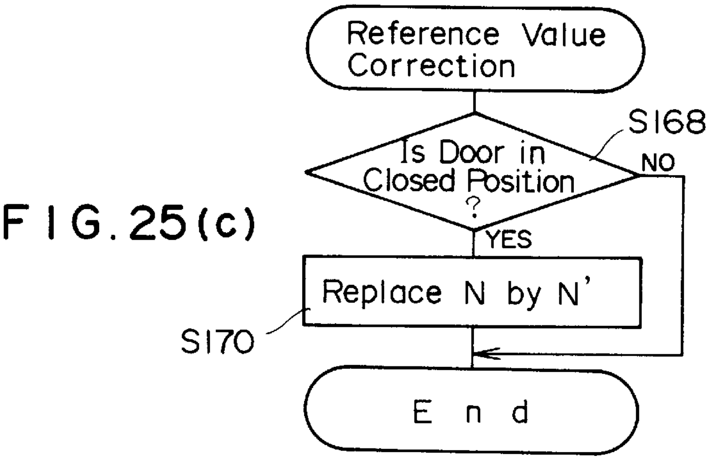

An example of the reference value correction program is shown in FIG. 25(*a*). In this example, first whether the door is closing or not is determined (STEP S160), and, if the door is not in the closing process, whether the door is in the closed position or not is judged (STEP S162). If the door is closing or if the door is in the closed position, the object-sensing received-light representative value N' is substituted as a new reference value N (STEP S164). This results in alteration of the reference value N for each of the door positions to accord with change of, for example, weather, as indicated by dot-and-dash lines in FIG. 10. The change of the reference values results, in turn, changes of upper and lower limit values defining the dead zone.

Another example of the reference value correction is shown in FIG. 25(*b*). In this example, the object-sensing received-light representative value N' multiplied by a predetermined factor m is used as a new reference value N. Alternatively, the result $\alpha$ of subtraction of N from N' may be multiplied by a predetermined factor, and the resulting product is added to the reference value N. The sum is used as a new reference value N.

A third example is shown in FIG. 25(*c*), in which judgement is made as to whether the door is in the closed position or not (STEP S168). Only when the door is in the closed position, the reference value N is replaced by the value N' (STEP S170). In this example, only the reference value N for the closed position is adjusted in accordance with changes of environment, and, this correction may be employed for the approach-side sensor. In this case, too, the object-sensing received-light representative value N' multiplied by a predetermined factor m may be used as a new reference value N. Alternatively, the result $\alpha$ of subtraction of N from N' may be multiplied by a predetermined factor, and the resulting product is added to the reference value N. The sum is used as a new reference value N.

Figure 26:
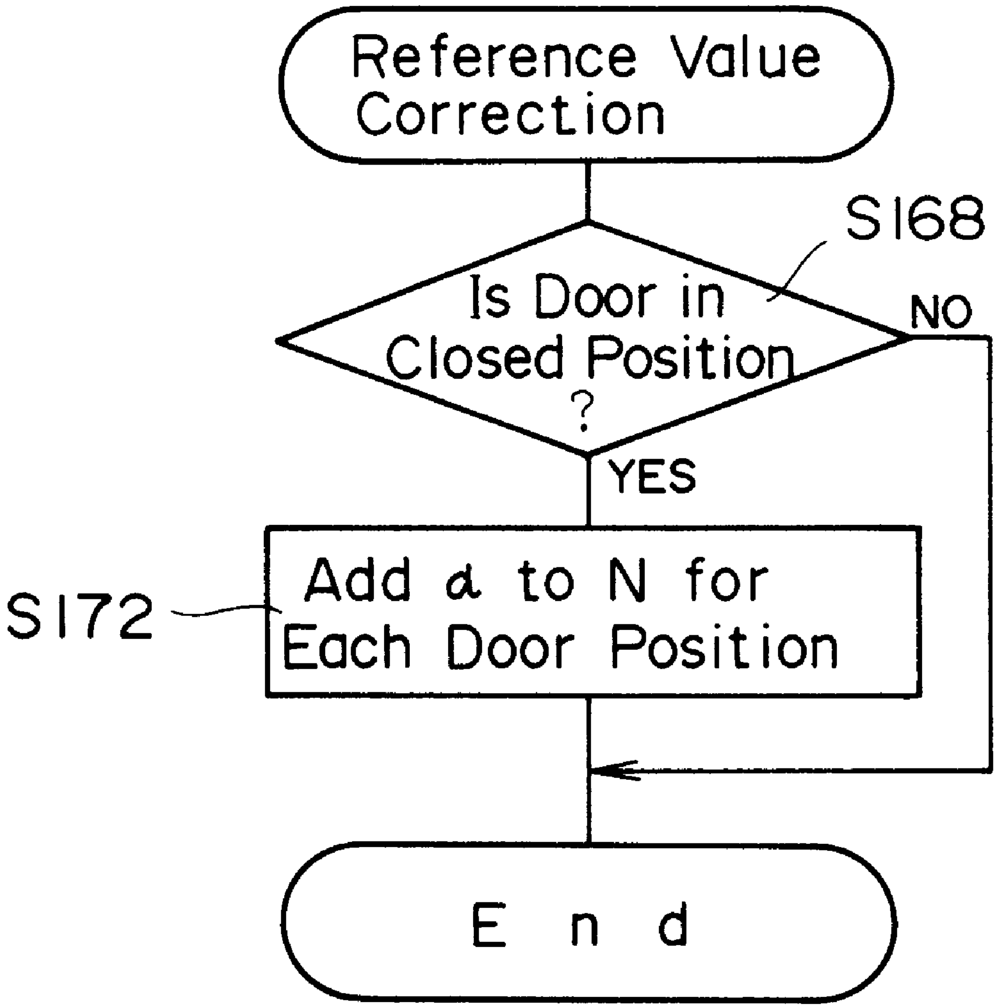
FIG. 26 is another example of flow chart illustrating how a reference value can be corrected.

Still another example is shown in FIG. 26. First, judgment is made as to whether the door is in the closed position (STEP S168). If the door is in the closed position, the result $\alpha$ of subtraction of N for the closed position from N' in the closed position is added to the reference values N for the respective door positions (STEP S172). Thus, the program shown in FIG. 26 is based on the assumption that the same environmental change in the closed position occurs in the remaining door positions. In this example, the object-sensing received-light representative value N' in the closed position multiplied by a predetermined factor may be added to the reference value for each of the door positions. Alternatively, the result $\alpha$ of subtraction of N for the closed position from N' in the closed position may be multiplied by a predetermined factor, and the resulting product is added to the reference value N for each of the remaining door positions. The sum is used as a new reference value N.

The reference values N are corrected to accord with changes of environment as shown in FIGS. 25(*a*), 25(*b*) and 25(*c*) and FIG. 26, because the judgment as to whether or not the object-sensing received-light representative value N' is within the dead zone is made by judging whether the absolute value of the difference between N' and N is larger than K/2, as shown in STEP S72 in FIG. 21B. If, however, the judgment as to whether or not the object-sensing received-light representative value N' is within the dead zone is made by, for example, judging whether the average value N' is less than the upper limit value and larger than the lower limit value of the dead zone, the reference values are not corrected, but the upper and lower limit values are corrected in the manner described above.

Dead Zone Width Correction Program

Figure 27:
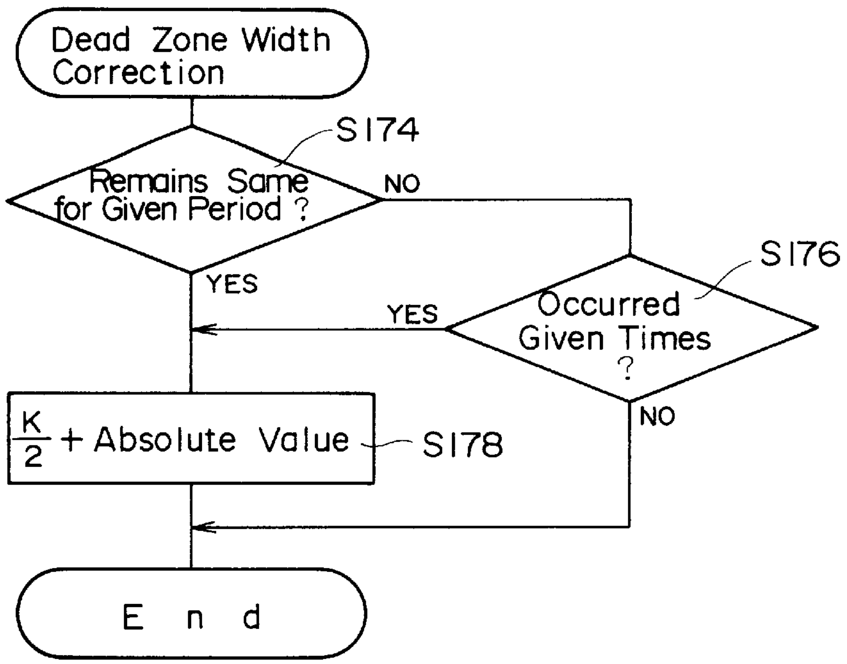
FIG. 27 is an example of flow chart illustrating how the width of a dead zone can be corrected.

As shown in FIG. 27, the dead zone width correction starts by judging whether the value N' for a given door position remains to be the same value outside the dead zone for more than a predetermined time period (STEP S174). The time period is the stationary object sensing time set by means of the ON-OFF switches 9 and 10 of the DIP switch SW2. This step is for permitting the door controller 400 to perform stop control for stopping the swing door when the sensor senses an object. If the answer in STEP S174 is NO, then judgment is made as to whether an event in which the object-sensing received-light representative value N' is outside the dead zone has occurred a predetermined number of times, for example, twice, at the same door position (STEP S176). This permits the door controller 400 to perform deceleration control for decelerating the door, or to reverse the door moving direction.

Figure 29A:
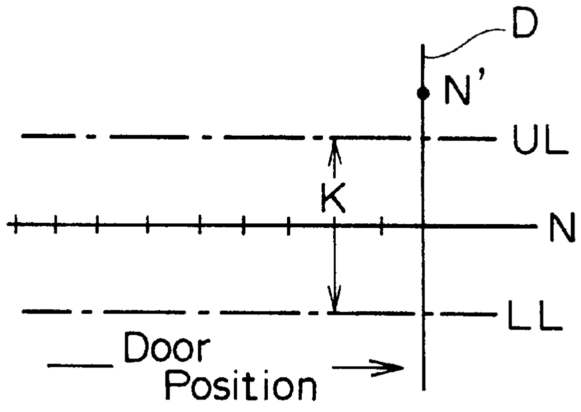
FIGS. 29(*a*), 29(*b*) and 29(*c*) illustrate how a reference value and a dead zone are changed.
Figure 29B:
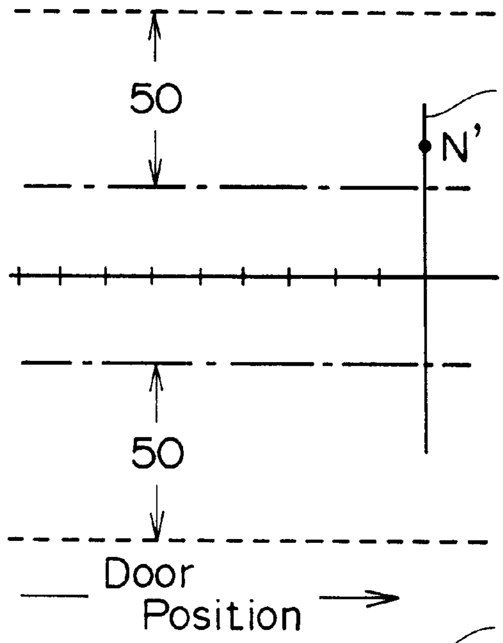
Figure 29C:
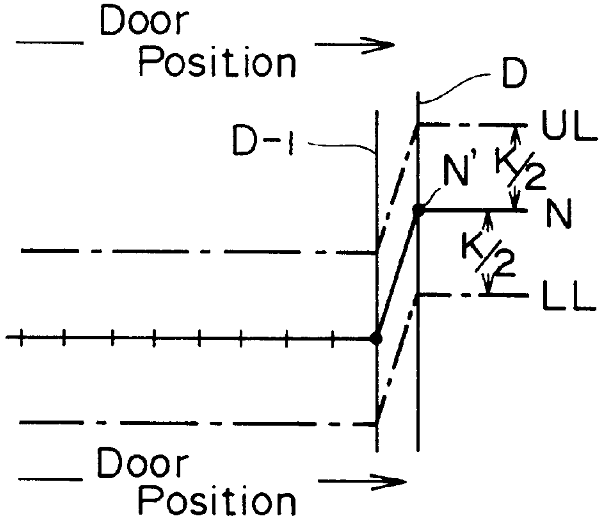

If the value N' in a given door position remains to be the same value outside the dead zone for more than a predetermined time period, or if an event in which the object-sensing received-light representative value N' is outside the dead zone has occurred a predetermined number of times at the same door position, K/2 plus the absolute value of a predetermined value, e.g. 50, is used as a new K/2 (STEP S178). By this step, the value N' which has been outside the dead zone as shown in FIG. 29(*a*) is brought into the dead zone which has been widened as shown in FIG. 29(*b*). The dead zone is also widened for the remaining door positions.

Figure 28:
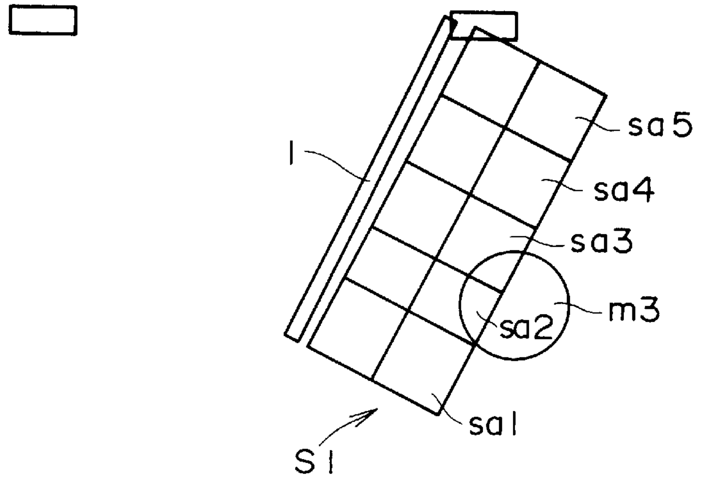
FIG. 28 is a plan view illustrating how the width of a dead zone at one door position is corrected.

Thus, if a stationary object m3, e.g. a flower pot, is sensed in the swing-side when the door is opening, as shown, for example, in FIG. 28, and the door 1 is caused to stop for a predetermined period in a given door position D (FIGS. 29(*a*), 29(*b*) and 29(*c*)) by the stop control provided by the door controller 400, the width of the dead zone for each of the sub-areas for each of the door positions is increased by the processing in STEP S178, and the door 1 can move to the fully opened position. Thereafter, the door 1 turns back toward the closed position. While the door 1 is closing, the reference value correction shown in FIGS. 25(*a*) or 25(*b*) is effected, so that the reference value N for the door position D where the sensor has sensed the stationary object m3 is corrected to a value determined with the object m3 taken into account, as shown in FIG. 29(*c*). In this case, the factor K/2 to be used in STEP S72 is changed to its original value.

If the system is arranged to perform deceleration control when the sensor senses the stationary object m3 during the opening operation of the swing door 1, the door 1 rotates at a reduced speed to the fully opened position, and, then, returns to the closed position. When this opening and closing operation is repeated a predetermined number of times, the reference value is corrected in the similar manner as stated above.

In FIGS. 29(*a*), 29(*b*) and 29(*c*), the reference values for the respective door positions nearer to the closed position than the door position D where the stationary object m3 has been sensed are shown to be constant by a straight line for ease of illustration. However, at the door position D, the reference value N changes. Therefore, the change from the reference value N for the preceding door position D-1 to the reference value for door position D is indicated by a slope. The changes of the upper and lower limits of the dead zone are also indicated by slopes.

Figure 30:
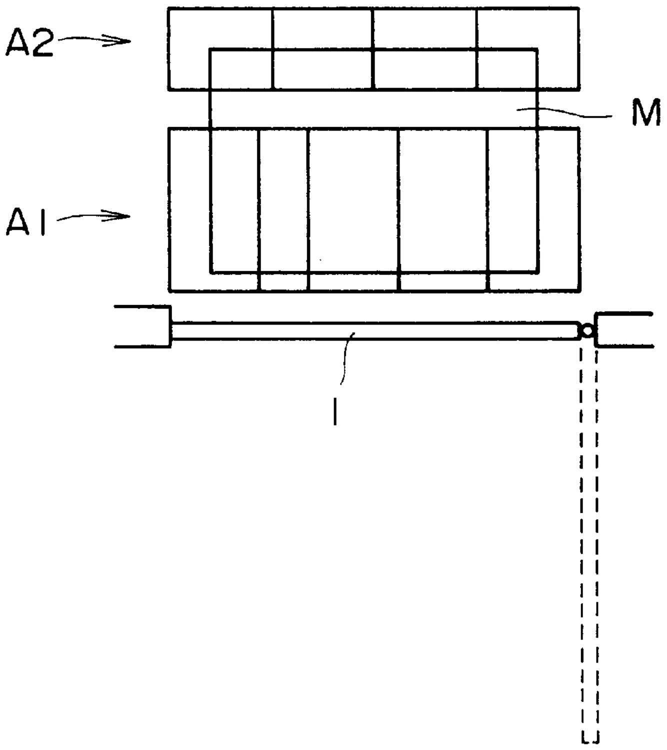
FIG. 30 is a plan view illustrating how the width of a dead zone at a different door position is corrected.

If a stationary object, e.g. a doormat M, is place in the approach side of the doorway when the swing door 1 is in the closed position, as shown in FIG. 30, the doormat M will be sensed by the main sensing area A1 and the auxiliary sensing area A2. Then, the door controller 400 controls the swing door 1 to open. The door 1 then returns to the closed position and the doormat M is sensed again, so that the door 1 is opened again. When such operation is repeated a predetermined number of times, it is detected in STEP S176, and, STEP S178 is executed to widen the dead zone. As a result, the swing door 1 stays in the closed position. When another object is sensed and the door 1 opens and, then, closes, the reference value correction shown in FIG. 25(*a*) or 25 (*b*) is executed, and the new reference value N with the object M taken into account is prepared for the closed position in a manner similar to the one described with respect to FIG. 28.

Another Embodiment

Figure 31:
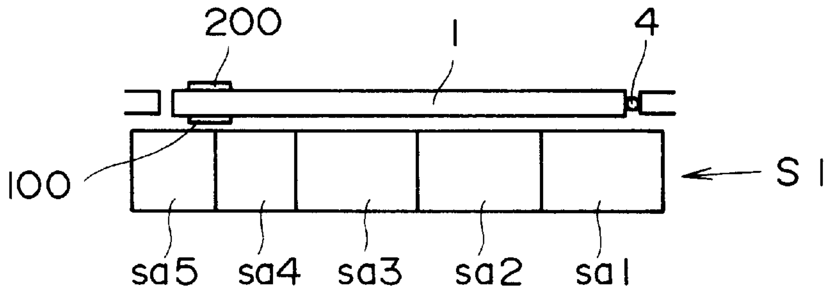
FIG. 31 is a plan view showing another example of sensing zone.

Various modifications to the embodiment described above may be contemplated. For example, the sensors 100 and 200 are mounted on the door at locations nearer to the distal edge of the door (i.e. at locations remote from the axis of rotation of the door) as in the above-described embodiment, so that the length of the light path of emitted light from each light-emitter to the floor and the length of the light path of reflected light from the floor to each light-receiver are shorter in the distal edge side of the door than in the proximal edge side of the door. In addition, as shown in FIG. 31 in which only the swing-side main sensing area S1 is shown, the areas on the floor of the distal edge side sub-areas sa5 and sa4 are made equal, and the areas on the floor of the remaining proximal edge side sub-areas sa3, sa2 and sa1 are made equal, with the area on the floor of the sub-areas sa5 and sa4 being smaller than the area on the floor of the sub-areas sa3, sa2 and sa1. Such different areas on the floor may be produced by appropriately choosing the angles of the respective light-emitters and the respective light-receivers with the floor and/or using appropriate lenses through which the emitted light and the reflected light pass from the light-emitters or to the light-receivers. Further, the light intensities of light emitted by the respective light-emitters are made equal to each other by appropriately choosing the angles of emitted light and reflected light and/or using appropriate lenses.

With this arrangement in which the light intensities of light emitted by the respective light-emitters are equal, the light intensity per unit area of the sub-areas sa5 and sa4 is greater than that of the sub-areas sa3, sa2 and sa1. That is, the light intensity is higher in the distal edge side of the door than in the proximal edge side, which can increase the sensing accuracy in the distal edge side where the door velocity is higher. In FIG. 31, although only the swing-side main sensing area S1 is shown, the swing-side auxiliary sensing area S2 and the approach-side main and auxiliary sensing areas may be arranged similar to the swing-side main sensing area S1. Furthermore, another sub-area having an area equal to that of the sub-area sa1 may be formed outward of the sub-area sa5 by light which crosses the distal edge of the door at an approximately half height of the door.

The entire disclosure of Japanese Patent Application No. HEI 8-38824 filed on Jan. 31, 1996 including the specification, claims, drawings and abstract are incorporated herein by reference in its entirety.

What is claimed is:

1. An object sensor system for a swing door for automatically opening and closing a doorway, said system including a sensor comprising a light-emitter and a light-receiver which are mounted on said swing door, said light-emitter emitting light toward a floor and said light-receiver receiving said light as reflected from the floor, whereby a generally pyramidal sensing zone containing said floor is formed;

wherein the shape of said sensing zone on the floor is generally rectangular, with the width of the rectangle being equal to or larger than the width of the swing door;

said generally pyramidal sensing zone includes a main sensing area located closer to said swing door, and an auxiliary sensing area adjacent to said main sensing area and remote from said swing door; and said auxiliary sensing area is disabled when said swing door moves.

2. The object sensor system according to claim 1 wherein each of said main and auxiliary sensing areas comprises a plurality of sub-areas, and part of the sub-areas is disabled in accordance with the width of the swing door on which said sensor is mounted.

3. The object sensor system according to claim 1 wherein the dimension of the main sensing area in the direction perpendicular to the swing door is such that the swing door can be braked when an object is sensed.

4. The object sensor system according to claim 1 wherein said sensor is a swing-side sensor mounted on the swing-side of said swing door; said main sensing area includes a plurality of sub-areas; and said sub-areas are sequentially disabled during the opening operation of said door, with the sub-area closest to the rotation center of the door disabled first.

5. The object sensor system according to claim 1 wherein said sensor is an approach-side sensor mounted on the approach-side of said swing door; said main and auxiliary sensing areas of said approach-side sensor are enabled when the door is in the fully opened position thereof; and said auxiliary sensing area is disabled during the closing operation of the door.

6. The object sensor system according to claim 1 wherein said sensor is an approach-side sensor mounted on the approach-side of said swing door; and one or more sub-areas are added to at least one of said main and auxiliary sensing areas in a region beyond the distal edge of the door when the door is in its fully opened position.

7. The object sensor system according to claim 1 wherein said system including two approach-side sensors mounted on respective ones of double swing doors; and one or more sub-areas of the main sensing area of each approach-side sensor near the distal edge of the door on which that sensor is mounted are disabled throughout the entire closing operation or when the door approaches the closed position thereof.

8. An object sensor system for a swing door for automatically opening and closing a doorway, said system including a sensor comprising a light-emitter and a light-receiver which are mounted on said swing door, said light-emitter emitting light toward a floor and said light-receiver receiving said light as reflected from the floor, whereby a sensing zone containing said floor and moving with said swing door is formed;

wherein said light-receiver develops a light-receiver output having a value corresponding to the amount of light received by said light-receiver at each of door positions which said door passes when said door swings between fully opened and fully closed positions of said door;

a reference value is set for said sensing zone at each of said door positions, the reference value for sensing zone at each of said door positions is formed from the light-receiver output developed when no object is present in said sensing zone; and a light-receiver output developed by said light-receiver at each of said door positions during a normal operation of the swing door is compared with the corresponding reference value.

9. The object sensor system according to claim 8 wherein said light-emitter emits a succession of a predetermined number of pulses of light at each of said door positions; and light-receiver outputs developed by said light-receiver in response to respective ones of said light pulses as reflected from the sensing zone are averaged, and the resulting average value is used as the received-light representative value of said light-receiver.

10. The object sensor system according to claim 9 wherein said light-emitter emits a succession of a predetermined number of pulses of light at each of said door positions; and a light-receiver output developed by said light receiver in response to the first one of said light pulses as reflected from the sensing zone is discarded, and the received-light representative value of said light-receiver is computed from the light-receiver outputs developed by said light-receiver in response to the remaining ones of said light pulses as reflected from the sensing zone.

11. The object sensor system according to claim 9 wherein said light-emitter emits a succession of a predetermined number of pulses of light at each of said door positions; at least one of largest and smallest ones of light-receiver outputs developed by said light-receiver in response to said light pulses as reflected from the sensing zone is discarded; and said light-emitter emits pulses of light at different time intervals from light-emitters of other sensors.

12. The object sensor system according to claim 9 wherein said light-emitter emits a succession of a predetermined number of pulses of light at each of said door positions; said light-emitter emits pulses of light at different time intervals from light-emitters of other sensors; and, when the difference between largest and smallest ones of light-receiver outputs developed by said light receiver in response to said light pulses as reflected from said sensing zone is equal to or larger than a predetermined value, all of the light-receiver outputs are ignored.

13. The object sensor system according to claim 8 wherein said light-emitter emits a succession of a predetermined number of pulses of light at each of said door positions; and light-receiver outputs developed by said light-receiver in response to respective ones of said light pulses as reflected from the sensing zone, except at least one of largest and smallest ones of said outputs, are averaged, and the resulting average value is used as the received-light representative value of said light-receiver.

14. The object sensor system according to claim 13 wherein said light-emitter emits a succession of a predetermined number of pulses of light at each of said door positions; and a light-receiver output developed by said light receiver in response to the first one of said light pulses as reflected from the sensing zone is discarded, and the received-light representative value of said light-receiver is computed from the light-receiver outputs developed by said light-receiver in response to the remaining ones of said light pulses as reflected from the sensing zone.

15. The object sensor system according to claim 8 wherein the sensor includes either a plurality of light-emitters and one or more light-receivers, or one or more light-emitters and a plurality of light-receivers, whereby the sensing zone comprises a plurality of sub-areas; and the reference value for each of the door positions is computed for each of said sub-areas.

16. The object sensor system according to claim 8 wherein said sensor includes a plurality of light-emitters and a plurality of light-receivers; said sensing zone includes sub-areas corresponding in number to either said light-emitters or said light-receivers; and two or more light-receivers are selectively operated simultaneously to develop light-receiver outputs.

17. The object sensor system according to claim 8 wherein the sensor includes a plurality of light-emitters and one or more light-receivers, or one or more light-emitters and a plurality of light-receivers, so that the sensing zone comprises the corresponding plurality of sub-areas; and said sub-areas are sequentially switched.

18. The object sensor system according to claim 8 wherein the sensor includes a plurality of light-receivers and one or more light-emitters; the sensing zone includes sub-areas corresponding in number to the light-receivers; light-receiver outputs developed for adjacent ones of said sub-areas are averaged; and the resulting average value is stored in a memory as the received-light representative value for each of said adjacent sub-areas.

19. An object sensor system for a swing door for automatically opening and closing a doorway, said system including a sensor comprising a light-emitter and a light-receiver which are mounted on said swing door, said light-emitter emitting light toward a floor and said light-receiver receiving said light as reflected from the floor, whereby a sensing zone containing said floor is formed;

wherein said light-receiver develops a light-receiver output having a value corresponding to the amount of light received by said light-receiver at each of door positions which said door passes when said door swings between fully opened and fully closed positions of said door;

a reference value is set for said sensing zone at each of said door positions, the reference value for said sensing zone is formed from the light-receiver output developed when no object is present in that sensing zone; and at least one limit value is set with respect to the reference value for the sensing zone at each of said door positions for defining a boundary of a dead zone, said dead zone being such that when the light-receiver output falls in said dead zone, it is judged that there is no object present in said sensing zone at that door position.

20. The object sensor system according to claim 19 wherein, when the light-receiver output developed by said light-receiver at each of said door positions during a normal operation of the swing door is within said dead zone, said light-receiver output is compared with the reference value for that door position, and the width of said dead zone is corrected in accordance with the result of the comparison.

21. The object sensor system according to claim 19 wherein, when the light-receiver output developed by said light-receiver at each of said door positions during a normal operation of the swing door is within said dead zone, the width of said dead zone is corrected in accordance with that light-receiver output.

22. The object sensor system according to claim 19 wherein, when the light-receiver output developed by said light-receiver at the closed position of the swing door is within said dead zone, said light-receiver output is compared with the reference value for said sensing zone at said closed position; and the width of said dead zone at each of the door positions is corrected in accordance with the result of the comparison.

23. The object sensor system according to claim 19 wherein, when the light-receiver output developed by said light-receiver at the closed position of the swing door is within said dead zone, the width of said dead zone at said closed door position is corrected in accordance with said light-receiver output.

24. The object sensor system according to claim 19 wherein when the light-receiver output developed by said light-receiver remains outside said dead zone for a predetermined time, said limit value is corrected such that the light-receiver output is located in the dead zone.

25. The object sensor system according to claim 19 wherein when the light-receiver output developed by said light-receiver remains at substantially the same value outside said dead zone for a predetermined time, said limit value is corrected such that the light-receiver output is located in the dead zone.

26. The object sensor system according to claim 19 wherein when a condition that the light-receiver output developed by said light-receiver at the closed position or one of the door positions is outside the dead zone is repeated a predetermined number of times, said limit value is corrected such that the light-receiver output is located in the dead zone.

27. The object sensor system according to claim 19 wherein the width of said dead zone is corrected in accordance with the light-receiver output developed by said light-receiver at each of said door positions when said swing door is closing.

28. An object sensor system for a swing door for automatically opening and closing a doorway, said system including a sensor comprising a light-emitter and a light-receiver which are mounted on said swing door, said light-emitter emitting light toward a floor and said light-receiver receiving said light as reflected from the floor, whereby a sensing zone containing said floor is formed, said sensor further including a controller for controlling said light-emitter and said light-receiver, said controller converting the amount of light received by said light-receiver into a light-receiver output having a value within a predetermined response range;

wherein a reference value is set for said sensing zone at each of said door positions, the reference value for said sensing zone is formed from the light-receiver output developed when no object is present in that sensing zone;

at least one limit value is set with respect to the reference value for the sensing zone at each of said door positions for defining a boundary of a dead zone, said dead zone being such that when the light-receiver output falls in said dead zone, it is judged that there is no object present in said sensing zone at that door position; and when said at least one limit value is outside said response range, said controller causes said limit value to be located in said response range.

29. The object sensor system according to claim 28 wherein said controller controls the amount of light to be emitted by said light-emitter in such a manner that said limit value is located within said response range of said controller.

30. An object sensor system for a swing door for automatically opening and closing a doorway, said system including a sensor including a light-emitter and a light-receiver mounted together at a location in the upper portion of the swing door, said light-emitter emitting light toward a floor and said light-receiver receiving said light as reflected from the floor, whereby a sensing zone containing said floor is formed;

wherein a path along which light emitted from said light-emitter to the floor follows or a path along which light reflected from the floor to said light-receiver follows is shorter on a distal edge side of the door than on a rotation axis side of the door where an axis of rotation of the door is located.

31. The object sensor system according to claim 30 wherein said sensor includes a plurality of light-emitters and one light-receiver, one light-emitter and a plurality of light-receivers, or a plurality of light-emitters and a plurality of light-receivers; the light intensity of light emitted from said one or a plurality of light-emitters or light reflected from a unit area of said floor to said one or a plurality of light-receiver increases from said rotation axis side toward said distal edge side of the door.

32. An object sensor system for a swing door for automatically opening and closing a doorway, said system including a sensor including a light-emitter and a light-receiver mounted together at a location in the upper portion of the swing door, said light-emitter emitting light toward a floor and said light-receiver receiving said light as reflected from the floor, whereby a sensing zone containing said floor is formed;

wherein a path along which light emitted from said light-emitter to the floor or a path along which light reflected from the floor to said light-receiver on a distal edge side of the door follows crosses the distal edge of the door at an approximately half height of the door.

33. The object sensor system according to claim 32 wherein said sensor includes a plurality of light-emitters and one light-receiver, one light-emitter and a plurality of light-receivers, or a plurality of light-emitters and a plurality of light-receivers; the light intensity of light emitted from said one or a plurality of light-emitters or light reflected from a unit area of said floor to said one or a plurality of light-receiver increases from said rotation axis side toward said distal edge side of the door.

* * * * *